US012797733B2

(12) United States Patent
Wang et al.

(10) Patent No.: US 12,797,733 B2
(45) Date of Patent: Nov. 17, 2026

(54) INTERACTION PROCESSING METHOD AND APPARATUS IN VIRTUAL SCENE, ELECTRONIC DEVICE, COMPUTER-READABLE STORAGE MEDIUM, AND COMPUTER PROGRAM PRODUCT

(71) Applicant: Tencent Technology (Shenzhen) Company Limited, Shenzhen (CN)

(72) Inventors: Ziyi Wang, Shenzhen (CN); Chenghao Ye, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 154 days.

(21) Appl. No.: 18/887,518

(22) Filed: Sep. 17, 2024

(65) Prior Publication Data

US 2025/0050213 A1 Feb. 13, 2025

Related U.S. Application Data

(63) Continuation of application No. PCT/CN2023/130011, filed on Nov. 6, 2023.

(30) Foreign Application Priority Data

Dec. 21, 2022 (CN) ......................... 202211652504.2

(51) Int. Cl.
*A63F 13/537* (2014.01)

(52) U.S. Cl.
CPC .................................. *A63F 13/537* (2014.09)

(58) Field of Classification Search
CPC ..................................................... A63F 13/537
See application file for complete search history.

(56) References Cited

U.S. PATENT DOCUMENTS 8,605,115 B2 * 12/2013 Dettinger ............... G06Q 90/00
705/14.1
10,664,863 B1 * 5/2020 Mishra ............... G06Q 30/0251
(Continued)

FOREIGN PATENT DOCUMENTS

CN 111905364 A 11/2020
CN 114082198 A 2/2022
CN 114722285 A 7/2022

OTHER PUBLICATIONS

Jan. 15, 2024—(WO) Search Report—App PCT/CN2023/130011.

*Primary Examiner* — Malina D. Blaise
(74) *Attorney, Agent, or Firm* — Banner & Witcoff, Ltd.

(57) ABSTRACT

Aspects described herein relate to virtual item recommendations between users or accounts. According to some aspects a recommendation process may include: displaying a virtual item warehouse logged in based on a first member account in a virtual scene, the virtual item warehouse including a plurality of virtual items; displaying, in an adjacent area of at least one target virtual item in a selected state in response to an item selection operation, at least one second member account in the virtual scene, the second member account being any member account other than the first member account; and transmitting a recommendation message to selected at least one target second member account in response to a member account selection operation, the recommendation message carrying an obtaining entry corresponding to the at least one target virtual item in the virtual item warehouse.

20 Claims, 14 Drawing Sheets

(56) References Cited

U.S. PATENT DOCUMENTS

| | | | | |
|---|---|---|---|---|
| 2010/0227682 | A1* | 9/2010 | Reville | A63F 13/69<br>463/29 |
| 2019/0201789 | A1 | 7/2019 | Yang et al. | |
| 2019/0275429 | A1* | 9/2019 | Yang | A63F 13/50 |
| 2020/0298123 | A1* | 9/2020 | Yang | A63F 13/35 |
| 2024/0029137 | A1* | 1/2024 | Zhang | A63F 13/87 |
| 2024/0181352 | A1* | 6/2024 | Benedetto | A63F 13/533 |
| 2024/0325911 | A1* | 10/2024 | Wang | A63F 13/56 |
| 2024/0350915 | A1* | 10/2024 | Wang | A63F 13/69 |
| 2024/0399252 | A1* | 12/2024 | Wang | A63F 13/5372 |
| 2025/0153046 | A1* | 5/2025 | Shi | A63F 13/67 |
| 2025/0166051 | A1* | 5/2025 | Zhu | G06Q 30/0643 |

* cited by examiner

FIG. 7
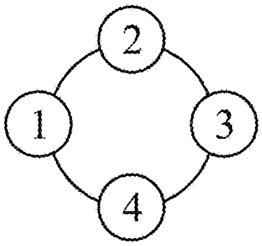
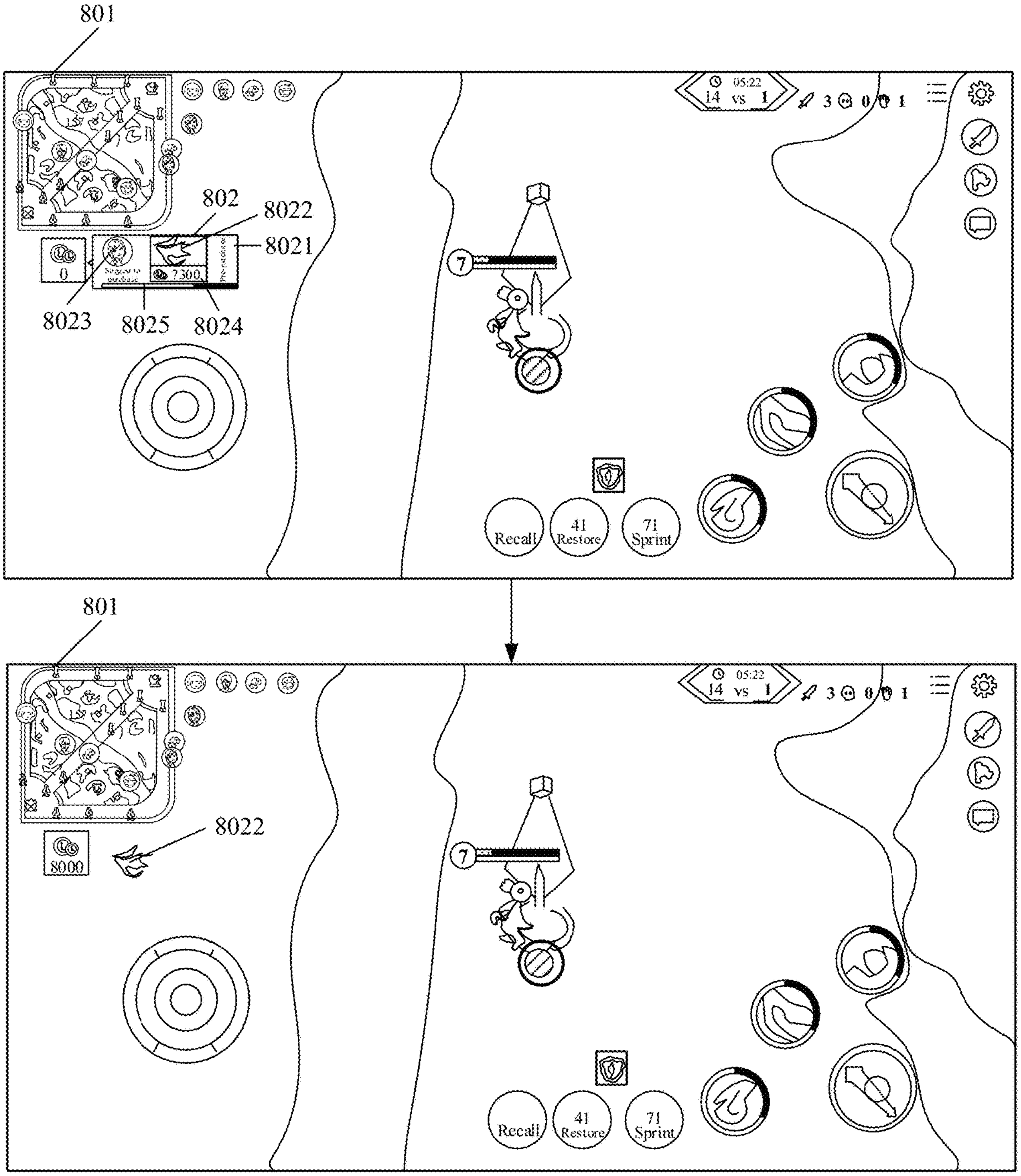
FIG. 8A

INTERACTION PROCESSING METHOD AND APPARATUS IN VIRTUAL SCENE, ELECTRONIC DEVICE, COMPUTER-READABLE STORAGE MEDIUM, AND COMPUTER PROGRAM PRODUCT

CROSS-REFERENCE TO RELATED APPLICATIONS

This application is a continuation application of PCT Application PCT/CN2023/130011, filed Nov. 6, 2023, which claims priority to Chinese Patent Application No. 202211652504.2 filed on Dec. 21, 2022, each entitled "INTERACTION PROCESSING METHOD AND APPARATUS IN VIRTUAL SCENE, ELECTRONIC DEVICE, COMPUTER-READABLE STORAGE MEDIUM, AND COMPUTER PROGRAM PRODUCT", and each of which is incorporated herein by reference in its entirety.

FIELD

This application relates to the field of human-computer interaction technologies, and in particular, to an interaction processing method and apparatus in a virtual scene, an electronic device, a computer-readable storage medium, and a computer program product.

BACKGROUND

A display technology based on graphics processing hardware expands channels for perceiving an environment and obtaining information. Particularly, a virtual scene display technology can realize diversified interaction between virtual objects controlled by users or artificial intelligence according to actual application requirements. The virtual scene display technology has various typical application scenarios, for example, simulating a real battle process between virtual objects in a virtual scene of a game.

By using a multiplayer online battle arena (MOBA) game as an example, equipment in the game may provide a very core set of functions, and proper equipment building can achieve twice the result with half the effort. Proper equipment building often brings a team win, and some mechanisms in the game may require players (that is, virtual objects controlled by the players) to wear corresponding equipment. For example, when an opponent camp has a restoration-type (e.g., healing-type) champion, a current camp needs to purchase equipment for reducing restoration (e.g., healing). However, because different players have different understanding for equipment and novice players might not be familiar with the equipment, some players might not purchase proper equipment. Accordingly, one player might need to inform another player of equipment that needs to be purchased.

In the related art, recommendations for equipment is usually completed by a player through typing or voice communication. The recommendations are inefficient and has strong limitations. For example, even though a novice player is informed of equipment that needs to be purchased, the novice player may not find a specific position of the equipment because the novice player is unfamiliar with the game.

BRIEF SUMMARY

Aspects described herein provide an interaction processing method and apparatus in a virtual scene, an electronic device, a computer-readable storage medium, and a computer program product, which can improve recommendation efficiency and equipping efficiency for a virtual item in a virtual scene, and reduce resource overhead of a terminal device and a server.

Technical solutions may be implemented as follows:

One or more aspects provide an interaction processing method in a virtual scene, performed by an electronic device, the method including:

displaying a virtual item warehouse logged in based on a first member account in a virtual scene, the virtual item warehouse including a plurality of virtual items;

displaying, in an adjacent area of at least one target virtual item in a selected state in response to an item selection operation, at least one second member account in the virtual scene, the second member account being any member account other than the first member account; and transmitting a recommendation message to selected at least one target second member account in response to a member account selection operation, the recommendation message carrying an obtaining entry corresponding to the at least one target virtual item in the virtual item warehouse.

Further aspects provide an interaction processing apparatus in a virtual scene, including:

a display module, configured to display a virtual item warehouse logged in based on a first member account in a virtual scene, the virtual item warehouse including a plurality of virtual items, the display module being further configured to display, in an adjacent area of at least one target virtual item in a selected state in response to an item selection operation, at least one second member account in the virtual scene, the second member account being any member account other than the first member account; and a transmission module, configured to transmit a recommendation message to selected at least one target second member account in response to a member account selection operation, the recommendation message carrying an obtaining entry corresponding to the at least one target virtual item in the virtual item warehouse.

Yet further aspects provide an interaction processing method in a virtual scene, performed by an electronic device, the method including:

displaying a virtual scene, a second member account being logged in to the virtual scene;

displaying at least one recommendation message transmitted by at least one first member account in the virtual scene, the recommendation message carrying an obtaining entry corresponding to at least one target virtual item in a virtual item warehouse, and the target virtual item being a virtual item selected by the first member account from the virtual item warehouse; and equipping, in response to a trigger operation on the obtaining entry in the at least one recommendation message, at least one virtual object controlled by the second member account with the at least one target virtual item.

One or more other aspects provide an interaction processing apparatus in a virtual scene, including:

a display module, configured to display a virtual scene, a second member account being logged in to the virtual scene, the display module being further configured to display at least one recommendation message transmitted by at least one first member account in the virtual scene, the recommendation message carrying an obtaining entry corresponding to at least one target virtual item in a virtual item warehouse, and the target virtual item being a virtual item selected by the first member account from the virtual item warehouse; and an equipping module, configured to equip, in response to a trigger operation on the obtaining entry in the at least one recommendation message, at least one virtual object controlled by the second member account with the at least one target virtual item.

According to one or more aspects, an electronic device is provided, the electronic device including:

a memory, configured to store executable instructions; and a processor, configured to implement, when executing the executable instructions stored in the memory, the interaction processing method in a virtual scene described herein.

According to one or more aspects, a computer-readable storage medium is provided, the medium having computer-executable instructions stored therein, the computer-executable instructions being configured to: when executed by a processor, implement the interaction processing method in a virtual scene described herein.

According to one or more aspects, a computer program product is provided, the computer program product including computer programs or computer-executable instructions, the computer programs or the computer-executable instructions being configured to: when executed by a processor, implement the interaction processing method in a virtual scene described herein.

Aspects described herein may provide the following beneficial effects:

After a target virtual item that needs to be recommended is selected from a virtual item warehouse, one or more member accounts are displayed in an adjacent area of the target virtual item for selection to provide the recommendation; and subsequently, after a target member account that needs to receive the recommendation is selected, a recommendation message carrying an obtaining entry corresponding to the target virtual item is transmitted to the target member account. In this way, a player associated with the target member account can quickly equip a virtual object controlled by the player with the target virtual item through the obtaining entry, thereby improving recommendation efficiency and equipping efficiency for a virtual item, and further improving game experience of the player. In addition, because time consumed by the player to find the target virtual item from the virtual item warehouse is reduced, the game process is accelerated, so that resource overhead of a terminal device and a server can be effectively reduced.

BRIEF DESCRIPTION OF THE DRAWINGS

FIG. 7 is a schematic diagram of an example sorting of a plurality of teammate avatars according to one or more aspects described herein.

FIG. 8A and FIG. 8B are schematic diagrams of an example application scenario of an interaction processing method in a virtual scene according to one or more aspects described herein.

DETAILED DESCRIPTION

Figure 1:
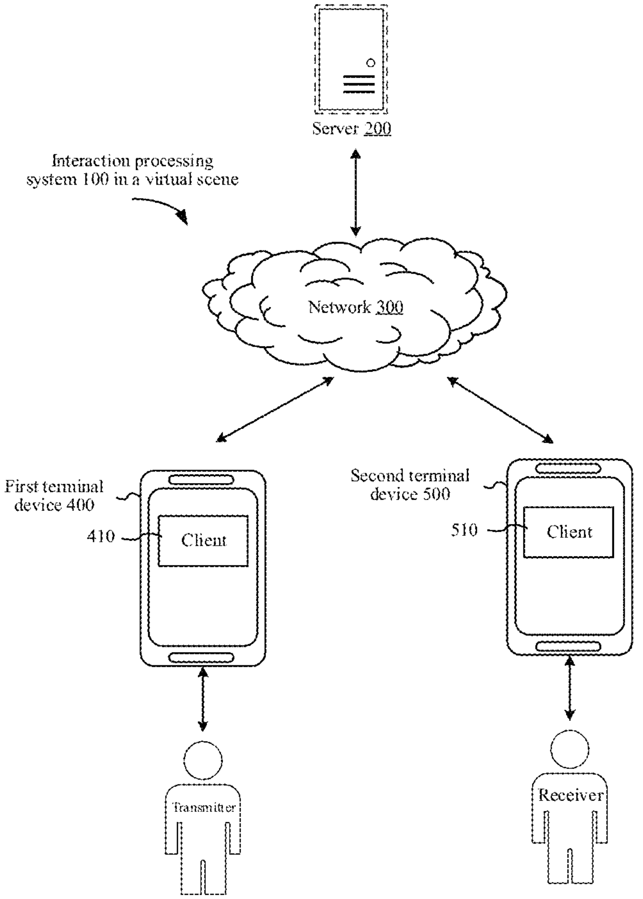
FIG. 1 is a schematic diagram of an example architecture of an interaction processing system 100 in a virtual scene according to one or more aspects described herein.

To make objectives, technical solutions, and advantages of aspects described herein clearer, the following describes aspects in further detail with reference to the accompanying drawings. The described examples are not to be considered as limiting. All other aspects that may be obtained by a person of ordinary skill in the art without creative efforts shall fall within the protection scope.

In the following descriptions, related "some aspects" describe a subset of all possible aspects. However, the "some aspects" may be the same subset or different subsets of all the possible aspects, and may be combined with each other without conflict.

Data related to user information and the like (for example, data of a game character controlled by a user) may be involved in various aspects described herein. Accordingly, the user's permission or consent may need to be obtained, and collection, use, and processing of the relevant data may need to comply with relevant laws, regulations, and standards of relevant countries and regions.

In the following descriptions, the included term "first/second . . . " is merely intended to distinguish similar objects but does not necessarily indicate a specific order of an object. "First/second . . . " is interchangeable in terms of a specific order or sequence if permitted, so that aspects described herein can be implemented in a sequence in addition to the sequence shown or described herein.

Unless otherwise defined, meanings of all technical and scientific terms used herein are the same as those usually understood by a person skilled in the art. Terms used herein are merely intended to describe objectives, but are not intended to limit this application.

Before aspects are further described in detail, nouns and terms used herein are described. The nouns and terms are applicable to the following explanations.

(1) In response to: Used to represent a condition or status on which one or more operations to be performed depend. When the condition or status is met, the one or more operations may be performed immediately or after a set delay. Unless explicitly stated, there is no limitation on the order in which a plurality of operations are performed.

(2) Virtual scene: A scene displayed (or provided) when an application is run on a terminal device. The scene may be a simulated environment of a real world, or may be a semi-simulated and semi-fictional virtual environment, or may be a completely fictional virtual environment. The virtual scene may be any one of a two-dimensional virtual scene, a 2.5-dimensional virtual scene, or a three-dimensional virtual scene, and the dimension of the virtual scene is not limited to the examples described herein. For example, the virtual scene may include the sky, the land, the ocean, and the like. The land may include environmental elements such as the desert and a city. A user may control a virtual object to move in the virtual scene.

(3) Virtual object: An image that can perform interaction with various persons and things in a virtual scene, or it is a movable object in a virtual scene. The movable object may be a virtual character, a virtual animal, a cartoon character, or the like, for example, a character or an animal displayed in a virtual scene. The virtual object may be a virtual image configured for representing a user in the virtual scene. The virtual scene may include a plurality of virtual objects, and each virtual object has a shape and a volume in the virtual scene, and occupies some space in the virtual scene.

(4) Virtual item: Also referred to as a game item, and is a collective name of various virtual items in a game. Game items have many different types and uses. Game items are commonly found in many game types. Various items are used in fighting, life, leisure, and the like in games. Types of the game items may be generally classified into: equipment-type items (namely, game equipment, which is an item with which a game character can be equipped, and affects attribute data and a fighting ability of the game character), consumable-type items (where consumable-type items are consumed after use, that is, one consumable-type item is reduced after being used, for example, various restoration portions, and teleportation items), and material-type items (which are some materials dedicated to a manufacturing system or a reinforcement system of a game, for example, various ores and leather used in manufacturing).

Aspects described herein provide an interaction processing method and apparatus in a virtual scene, an electronic device, a computer-readable storage medium, and a computer program product, which can improve recommendation efficiency and equipping efficiency for a virtual item. The following describes an exemplary application of an electronic device. The electronic device may be implemented as a terminal device (including a first terminal device and a second terminal device, where the first terminal device is a terminal device associated with a transmitter of a recommendation message, and the second terminal device is a terminal device associated with a receiver of the recommendation message), or may be implemented by the terminal device and a server collaboratively. The following uses an example in which the terminal device and the server collaboratively perform the interaction processing methods described herein in a virtual scene.

For example, FIG. 1 is a schematic diagram of an example architecture of an interaction processing system 100 in a virtual scene. To implement an application that supports improving recommendation efficiency for a virtual item, as shown in FIG. 1, the interaction processing system 100 in a virtual scene may include a server 200, a network 300, a first terminal device 400, and a second terminal device 500. The network 300 may be a local area network or a wide area network, or a combination thereof. The first terminal device 400 may be a terminal device associated with a transmitter (for example, a player 1) of a recommendation message. The second terminal device 500 may be a terminal device associated with a receiver (for example, a player 2) of the recommendation message. A client 410 run on the first terminal device 400 and a client 510 run on the second terminal device 500 may be clients of the same type, for example, the client may be for a shooting game (STG), a first-person shooting (FPS) game, a third-person shooting (TPS) game, a multiplayer online battle arena (MOBA) game, a role-playing game (RPG), a real-time strategy (RTS) game, a racing game (PCG), a music game (MUG), an arena friend program, or a game team program. The server 200 may be a back-end server (for example, a game back-end server) of the client 410 and the client 510.

In some arrangements, the player 1 may transmit, through the first terminal device 400 via the server 200, a recommendation message to the terminal device 500 associated with the player 2, where the recommendation message carries an obtaining entry (for example, a purchase entry) corresponding to at least one target virtual item (namely, a virtual item that the player 1 intends to recommend to the player 2) in a virtual item warehouse. In this way, the player 2 can purchase the virtual item recommended by the player 1 only by tapping on or otherwise selecting the purchase entry, thereby improving a success rate of the player in purchasing a proper virtual item in a game, and further improving game experience of the player.

There may be a plurality of first terminal devices 400 and second terminal devices 500. In other words, a plurality of players may recommend a virtual item to one player (in this case, there are a plurality of first terminal devices 400, and there is one second terminal device 500), or one player may recommend a virtual item to a plurality of players (in this case, there is one first terminal device 400, and there are a plurality of second terminal devices 500), or a plurality of players may recommend a virtual item to a plurality of players (in this case, there are a plurality of first terminal devices 400, and there are a plurality of second terminal devices 500). These examples are not limiting.

In some examples, the first terminal device 400 and the second terminal device 500 may implement the interaction processing methods in a virtual scene by running a computer program. For example, the computer program may be a native program or a software module in an operating system; may be a native application (APP), that is, a program that needs to be installed in the operating system to run, for example, a multiplayer online battle arena APP (namely, the foregoing client 410 and client 510); may be an applet, that is, a program that can be run only by downloading the program into a browser environment; or may be a game applet that can be embedded into any APP. In summary, the foregoing computer program may be any form of an application, a module or a plug-in.

In some other examples, aspects described herein may be implemented by a cloud technology. The cloud technology may be a hosting technology that unifies a series of resources such as hardware, software, and networks in a wide area network or a local area network to implement computing, storage, processing, and sharing of data.

The cloud technology may be a collective name of a network technology, an information technology, an integration technology, a management platform technology, an application technology, and the like based on an application of a cloud computing business mode, and may form a resource pool, which is used as required, and is flexible and convenient. The cloud computing technology may provide important support. A background service of a technical network system requires a large amount of computing and storage resources.

For example, the server 200 in FIG. 1 may be an independent physical server, or may be a server cluster or a distributed system formed by a plurality of physical servers, or may be a cloud server that provides basic cloud computing services such as a cloud service, a cloud database, cloud computing, a cloud function, cloud storage, a network service, cloud communication, a middleware service, a domain name service, a security service, a content delivery network (CDN), big data, and an artificial intelligence platform. The terminal device (including the first terminal device 400 and the second terminal device 500) may be a smartphone, a tablet computer, a notebook computer, a desktop computer, a smart speaker, a smartwatch, an in-vehicle terminal, or the like, but is not limited thereto. The terminal device (for example, the first terminal device 400 and the second terminal device 500) and the server 200 may be directly or indirectly connected in a wired or wireless communication manner. This is not limiting.

Figure 2A:
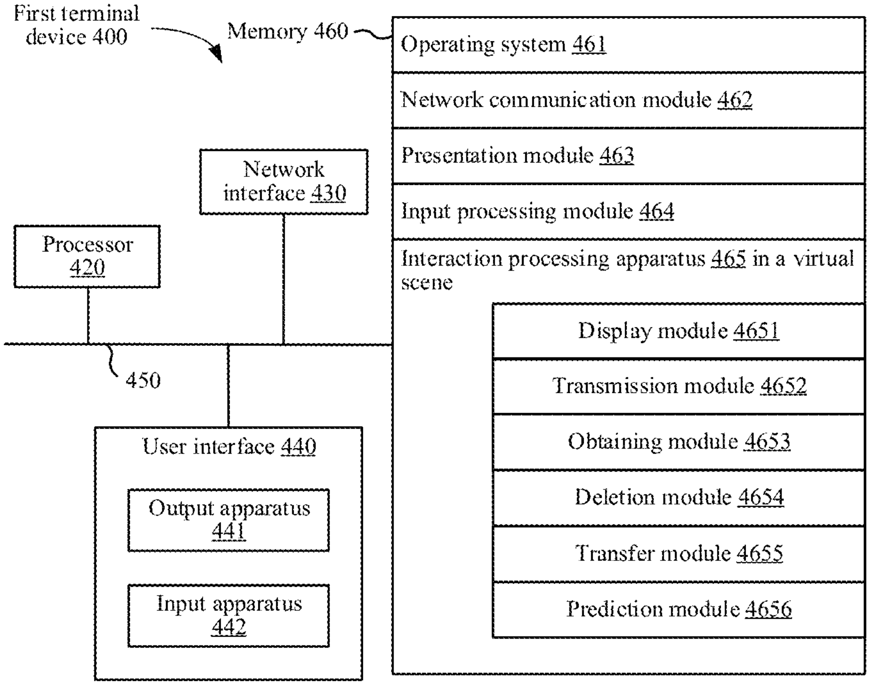
FIG. 2A is an example schematic structural diagram of a first terminal device 400 according to one or more aspects described herein.

The following continues to describe an example structure of the first terminal device 400 shown in FIG. 1. For example, FIG. 2A is an example schematic structural diagram of a first terminal device 400. The first terminal device 400 shown in FIG. 2A may include at least one processor 420, a memory 460, at least one network interface 430, and a user interface 440. All the components in the first terminal device 400 may be coupled together by a bus system 450. The bus system 450 may be configured to implement connection and communication between the components. In addition to a data bus, the bus system 450 further includes a power bus, a control bus, and a state signal bus. However, for clear description, various types of buses in FIG. 2A are marked as the bus system 450.

The processor 420 may be an integrated circuit chip having a signal processing capability, for example, a general purpose processor, a digital signal processor (DSP), or another programmable logic device, a discrete gate, transistor logical device, or a discrete hardware component. The general purpose processor may be a microprocessor, any conventional processor, or the like.

The user interface 440 may include one or more output apparatuses 441 that can present media content, including one or more speakers and/or one or more visual display screens. The user interface 440 may further include one or more input apparatuses 442, including user interface components that facilitate inputting of a user, such as a keyboard, a mouse, a microphone, a touch display screen, a camera, and other input button and control.

The memory 460 may be a removable memory, a non-removable memory, or a combination thereof. Exemplary hardware devices include a solid-state memory, a hard disk drive, an optical disc driver, and the like. In one example, the memory 460 may include one or more storage devices physically remote from the processor 420.

The memory 460 may include a volatile memory or a non-volatile memory, or may include both a volatile memory and a non-volatile memory. The non-volatile memory may be a read only memory (ROM). The volatile memory may be a random access memory (RAM). The memory 460 may include any other suitable type of memories.

In some arrangements, the memory 460 may store data to support various operations. Examples of the data include a program, a module, and a data structure, or a subset or a superset thereof, which are described below by using examples.

An operating system 461 may include a system program configured to process various basic system services and perform a hardware-related task, for example, a framework layer, a core library layer, and a driver layer, and is configured to implement various basic services and process a hardware-related task.

A network communication module 462 may be configured to reach (e.g., communicate) another computing device through one or more (wired or wireless) network interfaces 430. Exemplary network interfaces 430 include: Bluetooth, wireless compatible authentication (WiFi), a universal serial bus (USB), and the like.

A presentation module 463 may be configured to present information by using an output apparatus 441 (for example, a display screen or a speaker) associated with one or more user interfaces 440 (for example, a user interface configured to operate a peripheral device and display content and information).

An input processing module 464 may be configured to detect one or more user inputs or interactions from one of the one or more input apparatuses 442 and translate the detected input or interaction.

In some arrangements, the apparatus may be implemented by using software. FIG. 2A shows an interaction processing apparatus 465 in a virtual scene stored in the memory 460. The interaction processing apparatus 465 in a virtual scene may be software in a form such as a program and a plug-in, and may include the following software modules: a display module 4651, a transmission module 4652, an obtaining module 4653, a deletion module 4654, a transfer module 4655, and a prediction module 4656. These modules may be logical modules, and may be combined in different manners or further divided according to a function to be performed. In FIG. 2A, for case of description, all of the foregoing modules are illustrated. However, fewer or more modules may be used. For example, the interaction processing apparatus 465 in a virtual scene may, in some instances, include only the display module 4651 and the transmission module 4652. Functions of the modules are described below.

Figure 2B:
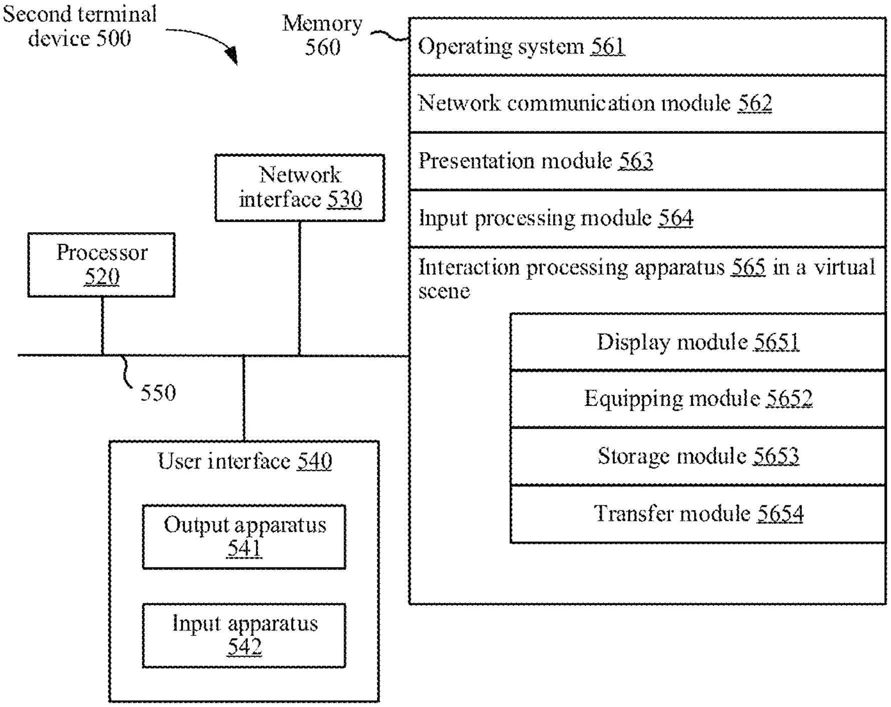
FIG. 2B is an example schematic structural diagram of a second terminal device 500 according to one or more aspects described herein.

The following continues to describe an example structure of the second terminal device 500 shown in FIG. 1. For example, FIG. 2B is a schematic structural diagram of a second terminal device 500. As shown in FIG. 2B, the second terminal device 500 includes at least one processor 520, a network interface 530, a user interface 540 (including an output apparatus 541 and an input apparatus 542), a bus system 550, and a memory 560. The memory 560 includes an operating system 561, a network communication module 562, a presentation module 563, an input processing module 564, and an interaction processing apparatus 565 in a virtual scene. The interaction processing apparatus 565 in a virtual scene may be software in a form such as a program and a plug-in, and may include the following software modules: a display module 5651, an equipping module 5652, a storage module 5653, and a transfer module 5654. These modules are logical modules, and may be combined in different manners or further divided according to a function to be performed. In FIG. 2B, for case of description, all of the foregoing modules are illustrated. However, fewer or more modules may be used. For example, the interaction processing apparatus 565 in a virtual scene may, in some instances, include only the display module 5651 and the equipping module 5652. Functions of the modules are described below.

The following describes an interaction processing method in a virtual scene from a perspective of interaction between the first terminal device and the second terminal device. The first terminal device may be a terminal device associated with a transmitter of a recommendation message, and the second terminal device may be a terminal device associated with a receiver of the recommendation message. There may be one or more first terminal devices and one or more second terminal devices.

Figure 3:
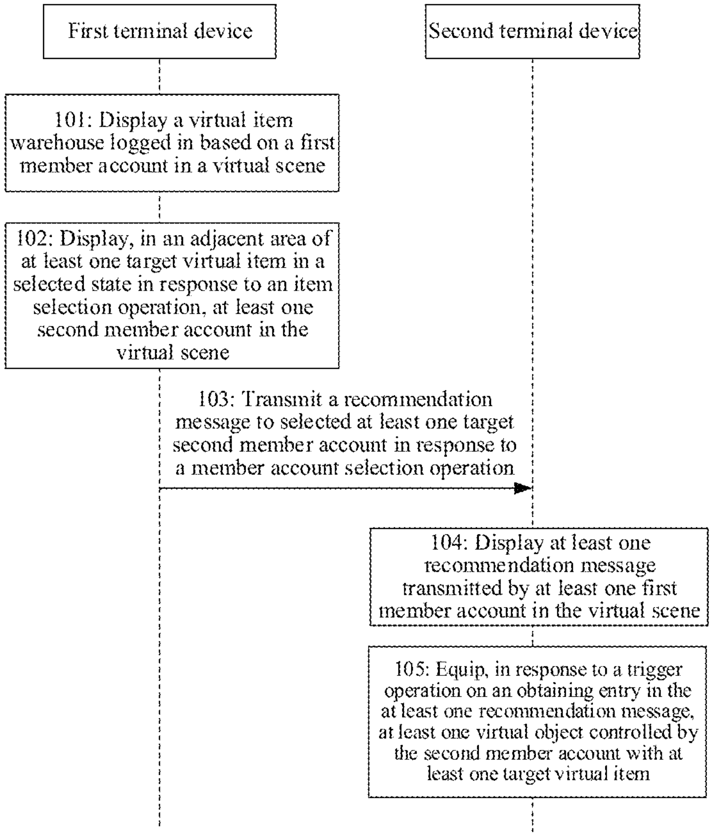
FIG. 3 is a schematic flowchart of an example interaction processing method in a virtual scene according to one or more aspects described herein.

For example, FIG. 3 is a schematic flowchart of an example interaction processing method in a virtual scene. Descriptions are made with reference to operations shown in FIG. 3.

The method shown in FIG. 3 may be performed by various forms of computer programs run on a terminal device (including a first terminal device and a second terminal device), not limited to a client. For example, the operating system, the software module, a script, and an applet described above may also perform the method. Therefore, the client is not to be regarded as a limitation. In addition, for case of description, the terminal device and the client (for example, a virtual scene client) running on the terminal device are not specifically distinguished below.

Operation 101: The first terminal device displays a virtual item warehouse determined based on a logged-in first member account in a virtual scene.

The virtual item warehouse (for example, a virtual store) may include a plurality of virtual items in the virtual scene.

In some arrangements, an example in which the first terminal device is a terminal device A associated with a player 1 is used. A virtual scene client (for example, a MOBA game APP) may be run on the terminal device A. After the player 1 logs in to the virtual scene client by using a first member account (for example, a game account 1 previously registered by the player 1), a virtual scene may be displayed on the terminal device A. At least one virtual object (for example, a virtual object 1) controlled by the player 1 may be displayed in the virtual scene. In other words, the player 1 may control the virtual object 1 through the game account 1. In addition, a virtual item warehouse entry (for example, a virtual store entry) may further be displayed in the virtual scene. When a tap (or other selection) operation by the player 1 on the virtual item warehouse entry is received, the virtual item warehouse may be displayed in the virtual scene, and a plurality of different types of virtual items may be displayed in the virtual item warehouse for the player 1 to select.

Operation 102: The first terminal device displays, in an adjacent area of at least one target virtual item in a selected state in response to an item selection operation, at least one second member account in the virtual scene.

The second member account may be any member account in the virtual scene other than the first member account, or may be a member account having a social relationship with the first member account in the virtual scene. For example, the player 1 may recommend game equipment to all other players in a game, or may recommend game equipment only to a teammate of the player.

In some arrangements, when the at least one second member account includes a plurality of second member accounts, the first terminal device may implement the displaying at least one second member account in the virtual scene in the following manner: displaying the plurality of second member accounts in the virtual scene in a wheel or list manner (for example, displaying at least one of an avatar or a name of the second member account, or displaying at least one of an avatar or a name of a virtual object controlled by the second member account). The plurality of second member accounts may be displayed in a specific sorting manner (in a wheel or a list). The sorting manner ,au omc;ide one of the following: descending order of function priorities of a plurality of virtual objects respectively controlled by the plurality of second member accounts in the virtual scene; descending order of interaction frequencies between the plurality of second member accounts and the first member account; order of moments when the plurality of second member accounts perform interaction with the first member account last time from a current moment from near to far; or descending order of levels of the plurality of second member accounts.

Functions of virtual objects in the virtual scene may be represented by route (e.g., path) division. For example, by using a MOBA game as an example, according to battle positions of virtual objects in a battle, types of the virtual objects may be divided into at least one of a top, a mid, a jungler, an ADC, or a support. Different types of virtual objects may need to be responsible for different functions in the battle. For example, the top may be mainly responsible for damage output (which corresponds to a highest function priority), the support may be mainly responsible for treatment, providing a field of view, and the like (which corresponds to a lowest function priority). For example, by using an FPS game with a team battle an example, types of virtual objects in the game may include at least one of a gunner, a sniper, a medic, a driver, or a commander. Different types of virtual objects may need to be responsible for different functions in a battle. For example, the commander is mainly responsible for tactical development (which corresponds to a highest function priority), and the medic is mainly responsible for treatment (which corresponds to a lowest function priority).

In some other examples, the first terminal device may alternatively implement the displaying at least one second member account in the virtual scene in the following manner: performing the following processing for each second member account: displaying the second member account in an untriggerable (i.e., cannot be triggered or otherwise selected) state in response to that the second member account has owned the at least one target virtual item or has no qualification for using the at least one target virtual item (for example, due to a limitation of a system or an insufficient level of the member account, the second member account has no qualification for using the target virtual item), which indicates that the second member account cannot be currently selected, and gray processing may be performed on the second member account; and displaying the second member account in a triggerable state in response to that the second member account has not owned the at least one target virtual item and has qualification for using the at least one target virtual item, which indicates that the second member account is currently in a selectable state.

Figure 4A:
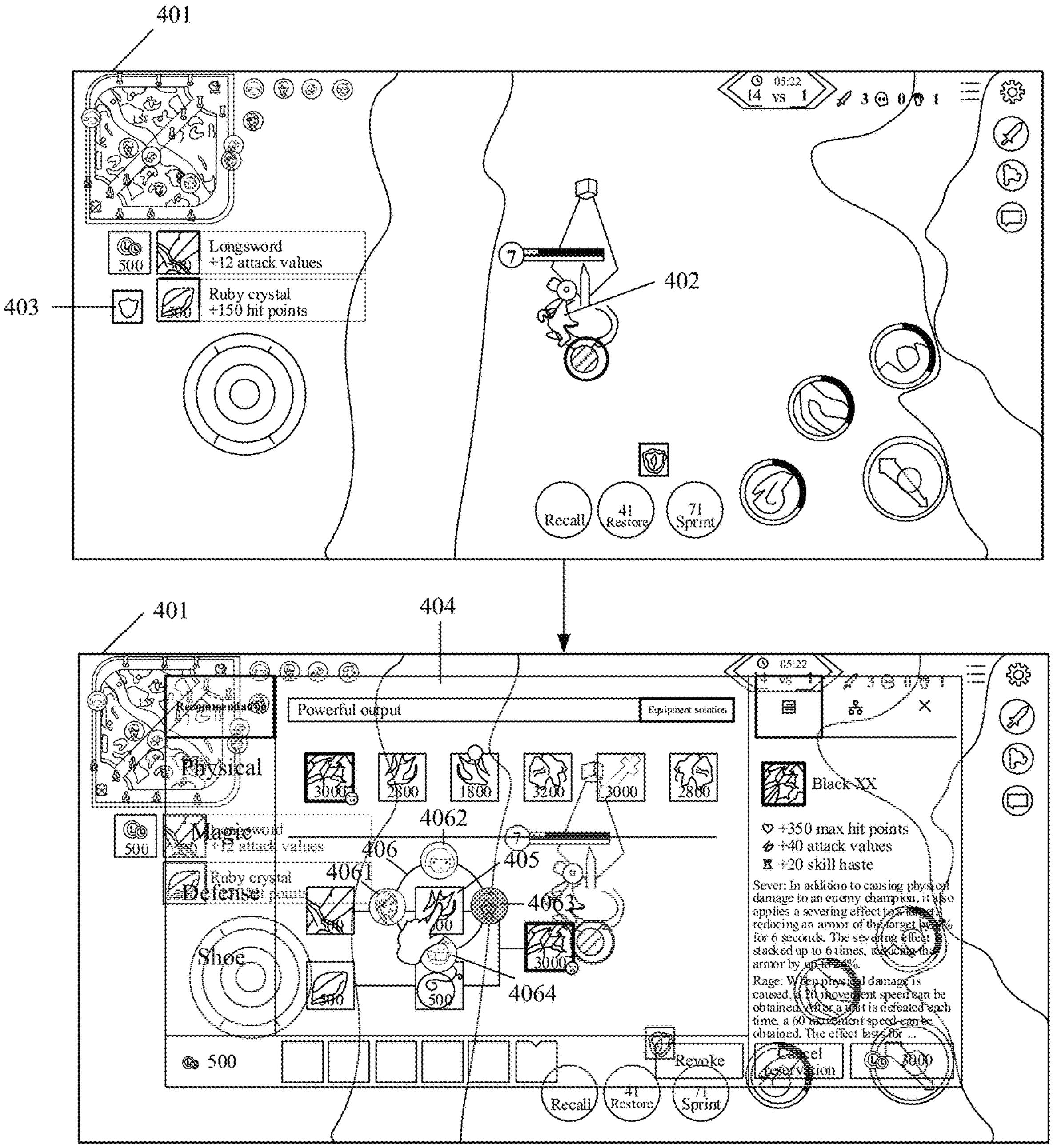
FIG. 4A to FIG. 4E are schematic diagrams of an example application scenario of an interaction processing method in a virtual scene according to one or more aspects described herein.

An example in which the first terminal device is the terminal device A associated with the player 1 is used in the following description. FIG. 4A is a schematic diagram of an example application scenario of an interaction processing method in a virtual scene. As shown in FIG. 4A, after the player 1 logs in to the virtual scene client run on the terminal device A based on the first member account (for example, the game account 1 previously registered by the player 1), a virtual scene 401 may be displayed on a human-computer interaction interface of the terminal device A. A virtual object 402 (for example, the virtual object 1) controlled by the player 1 may be displayed in the virtual scene 401. The player 1 may control the virtual object 402 to perform activities in the virtual scene 401 through the game account 1. A virtual store entry 403 may be further displayed in the virtual scene 401. When a tap (e.g., selection) operation by the player 1 on the virtual store entry 403 displayed in the virtual scene 401 is received, a virtual store 404 may be displayed in the virtual scene 401, and a plurality of virtual items may be displayed in the virtual store 404 for the player 1 to select. When a long-press operation by the player 1 on a virtual item 405 (that is, a target virtual item selected by the player 1 to recommend) displayed in the virtual store 404 is received (for example, the tap operation is to purchase the virtual item 405, and the long-press operation is to call out a wheel 406 to recommend the virtual item), the wheel 406 may be displayed in an adjacent area of the virtual item 405, and avatars of virtual objects respectively controlled by a plurality of teammates of the player 1 are displayed in the wheel 406, which include: for example, an avatar 4061 of a virtual object 2 controlled by a teammate 1 through a game account 2, an avatar 4062 of a virtual object 3 controlled by a teammate 2 through a game account 3, an avatar 4063 of a virtual object 4 controlled by a teammate 3 through a game account 4, and an avatar 4064 of a virtual object 5 controlled by a teammate 4 through a game account 5. Assuming that the virtual object 4 controlled by the teammate 3 has been equipped with the virtual item 405 or the virtual object 4 cannot be equipped with the virtual item 405 due to a limitation of a game system, gray processing may be performed on the avatar 4063 of the virtual object 4 controlled by the teammate 3 (e.g., the avatar 4063 may be displayed in a grayed-out state). In this case, the avatar 4063 is in an unselectable state, so that a purchased virtual item can be avoided being repeatedly recommended to the teammate 3, or a virtual item that cannot be equipped can be avoided being recommended to the teammate 3, thereby avoiding causing distress to the teammate 3.

In some other examples, the first terminal device may alternatively implement the displaying at least one second member account in the virtual scene in the following manner: obtaining a second member account having a social relationship (for example, a friend relationship, or being in a same camp) with the first member account in the virtual scene; deleting, from a plurality of second member accounts, a second member account that meets at least one of the following conditions: the second member account has owned the at least one target virtual item, or the second member account has no qualification for using the at least one target virtual item; and displaying remaining at least one second member account.

Figure 4B:
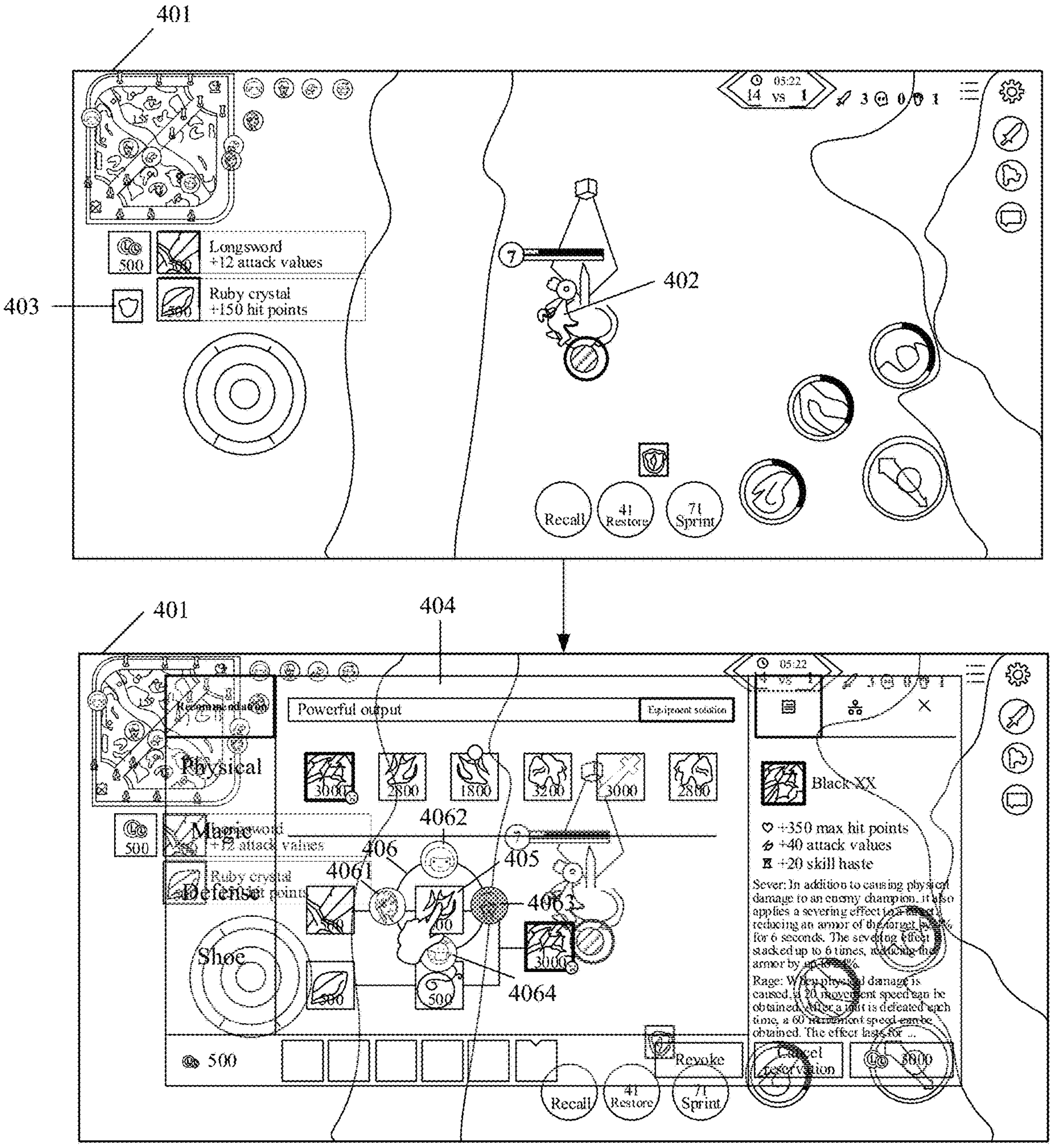

An example in which the first terminal device is the terminal device A associated with the player 1 is used in the following description. FIG. 4B is a schematic diagram of an application scenario of an interaction processing method in a virtual scene. As shown in FIG. 4B, after the player 1 logs in to the virtual scene client run on the terminal device A based on the first member account (for example, the game account 1), a virtual scene 401 may be displayed on a human-computer interaction interface of the terminal device A. A virtual object 402 (for example, the virtual object 1) controlled by the player 1 and a virtual store entry 403 may be displayed in the virtual scene 401. When a tap (or other selection) operation by the player 1 on the virtual store entry 403 is received, a virtual store 404 may be displayed in the virtual scene 401, and a plurality of virtual items may be displayed in the virtual store 404. When a long-press operation by the player 1 on a virtual item 405 (that is, a target virtual item selected by the player 1) displayed in the virtual store 404 is received, other game accounts belonging to a same camp (or team) with the game account 1 may be first obtained, which include: for example, a game account 2 registered by a player 2, a game account 3 registered by a player 3, a game account 4 registered by a player 4, and a game account 5 registered by a player 5 (in other words, the player 2 to the player 5 are teammates of the player 1). Next, a game account that meets the following conditions may be deleted from the plurality of game accounts: a game account that has owned or owns the virtual item 405 or a game account that has no qualification for using the virtual item 405. Assuming that a virtual object 4 controlled by the game account 4 has been equipped with the virtual item 405, the game account 4 may be deleted. Subsequently, a list 407 may be displayed in an adjacent area (for example, a right side) of the virtual item 405, and avatars of virtual objects controlled by the remaining game accounts are displayed in the list 407, which include: for example, an avatar 4071 of a virtual object 2 controlled by the player 2 through the game account 2, an avatar 4072 of a virtual object 3 controlled by the player 3 through the game account 3, and an avatar 4073 of a virtual object 5 controlled by the player 5 through the game account 5. In this way, space for displaying to-be-recommended objects can be reduced.

In some examples, an item recommendation function may have a cool down (CD) time. For example, a cool down time may refer to a period of time, after item recommendation is performed once, that needs to buffer and wait before the item recommendation may be allowed to be performed again. In this case, before performing operation 102 shown in FIG. 3, the first terminal device may further perform operation 106 and operation 107 shown in FIG. 5. Descriptions are made with reference to operations shown in FIG. 5.

Operation 106: The first terminal device receives an item selection operation.

In some examples, the item selection operation may be a long-press operation on the target virtual item. For example, an example in which the first terminal device is the terminal device A associated with the player 1 is used. When the terminal device A receives a long-press operation by the player 1 on the target virtual item displayed in the virtual item warehouse, subsequent operation 107 is performed.

Operation 107: The first terminal device determines whether a time difference between a first moment and a second moment is less than a set time difference threshold; and perform operation 108 if the time difference between the first moment and the second moment is less than a set time difference threshold; or perform operation 102 if the time difference between the first moment and the second moment is not less than the set time difference threshold.

The first moment may be a moment when the recommendation message is transmitted last time, and the second moment may be a moment when the item selection operation is received. In other words, when the item selection operation triggered by the player (for example, a long-press operation on the target virtual item) is received, the first terminal device first determines whether a time difference between a moment when the item selection operation is received and a moment when the recommendation message is transmitted last time is less than the set time difference threshold (for example, 60 seconds), that is, determines whether the item recommendation function is in a cool down state. If the item recommendation function is in the cool down state, prompt information may be displayed in the virtual scene, to indicate to the player that the item recommendation function is currently in the cool down state, and to please try again later. If the item recommendation function is not in the cool down state, the at least one second member account in the virtual scene may be displayed in the adjacent area of the target virtual item, for the player to select.

Operation 108: The first terminal device displays prompt information.

The prompt information is configured for prompting the player that the item recommendation function is currently in the cool down state, and please try again later.

In some examples, before a transmitter (for example, the player 1) of the recommendation message selects a virtual item (namely, the target virtual item) that needs to be recommended from the virtual item warehouse, a selectable virtual item may also be recommended to the player 1, to reduce time required for the player 1 to determine which virtual item from the virtual item warehouse to recommend. For example, in the virtual item warehouse, a display manner of a virtual item recommended to the first member account may be different from a display manner of another virtual item in the virtual item warehouse. For example, the virtual item recommended to the first member account may be displayed in a highlighted or flashing manner. The other virtual item is a virtual item other than the virtual item recommended to the first member account in the plurality of virtual items. The virtual item recommended to the first member account may include at least one of the following: a virtual item of which a quantity of use times by the first member account is greater than a quantity threshold (for example, a virtual item used at a high frequency by a virtual object controlled by the transmitter of the recommendation message), or a virtual item collaboratively usable with a virtual item that has been or is owned by the first member account. In this way, time required for the player to select a virtual item for recommendation can be effectively reduced, thereby improving game experience of the player.

Operation 103: The first terminal device transmits a recommendation message to a second terminal device associated with selected at least one target second member account in response to a member account selection operation.

The recommendation message may carry an obtaining entry (for example, a purchase entry) corresponding to the at least one target virtual item in the virtual item warehouse.

In some example, when the at least one target virtual item includes a plurality of target virtual items and the at least one target second member account includes a plurality of target second member accounts, the first terminal device may implement the transmitting a recommendation message to a second terminal device associated with selected at least one target second member account in the following manner: transmitting a same recommendation message to a plurality of second terminal devices respectively associated with the plurality of target second member accounts, the recommendation message carrying obtaining entries respectively corresponding to the plurality of target virtual items in the virtual item warehouse.

An example in which the first terminal device is the terminal device A associated with the player 1 is used in the following description. Assuming that the player 1 selects three virtual items from the virtual item warehouse (in other words, there are three target virtual items, which are assumed as a virtual item 1, a virtual item 2, and a virtual item 3), and assuming that the player 1 selects two second member accounts (in other words, there are two target second member accounts, which are assumed as the game account 2 registered by the player 2 and the game account 3 registered by the player 3), the terminal device A may transmit a same recommendation message to a terminal device B associated with the player 2 and a terminal device C associated with the player 3. The recommendation message may carry or otherwise include obtaining entries respectively corresponding to the virtual item 1, the virtual item 2, and the virtual item 3 in the virtual item warehouse. For example, the recommendation message may carry three obtaining entries, where an obtaining entry 1 corresponds to the virtual item 1, an obtaining entry 2 corresponds to the virtual item 2, and an obtaining entry 3 corresponds to the virtual item 3. In this way, the player 2 or the player 3 can select a virtual item suitable for the virtual object controlled by the player 2 or the player 3 according to the recommendation of the player 1.

The plurality of target virtual items may alternatively correspond to a same obtaining entry. For example, the virtual item 1, the virtual item 2, and the virtual item 3 may correspond to a same obtaining entry. In this way, the player 2 or the player 3 may equip a plurality of virtual items to the virtual object controlled by the player 2 or the player 3 at a time. These examples are not limiting.

In some other arrangements, when the at least one target virtual item includes a plurality of target virtual items and the at least one target second member account includes a plurality of target second member accounts, the first terminal device may alternatively implement the transmitting a recommendation message to a second terminal device associated with selected at least one target second member account in the following manner: transmitting a plurality of recommendation messages in a one-to-one correspondence to a plurality of second terminal devices respectively associated with the plurality of target second member accounts, each recommendation message carrying an obtaining entry corresponding to one target virtual item in the virtual item warehouse.

An example in which the first terminal device is the terminal device A associated with the player 1 is used in the following description. Assuming that the player 1 selects three virtual items from the virtual item warehouse (in other words, there are three target virtual items, which are assumed as a virtual item 1, a virtual item 2, and a virtual item 3), and assuming that the player 1 selects three second member accounts (in other words, there are three target second member accounts, which are assumed as the game account 2 registered by the player 2, the game account 3 registered by the player 3, and the game account 4 registered by the player 4), the terminal device A may respectively transmit recommendation messages in a one-to-one correspondence to a terminal device B associated with the player 2, a terminal device C associated with the player 3, and a terminal device D associated with the player 4. For example, the terminal device A may transmit a recommendation message 1 to the terminal device B, transmit a recommendation message 2 to the terminal device C, and transmit a recommendation message 3 to the terminal device D. The recommendation message 1 carries an obtaining entry corresponding to the virtual item 1 in the virtual item warehouse (in other words, the virtual item 1 is recommended to the player 2), the recommendation message 2 carries an obtaining entry corresponding to the virtual item 2 in the virtual item warehouse (in other words, the virtual item 2 is recommended to the player 3), and the recommendation message 3 carries an obtaining entry corresponding to the virtual item 3 in the virtual item warehouse (in other words, the virtual item 3 is recommended to the player 4). In this way, the player 1 can recommend different virtual items to different players in batches, so that recommendation efficiency for the virtual items is further improved.

In some examples, when the player selects a plurality of virtual items and a plurality of second member accounts, a recommendation message transmitted to each second member account may alternatively be determined based on artificial intelligence.

For example, the first terminal device may implement the transmission of a plurality of recommendation messages in a one-to-one correspondence to a plurality of second terminal devices respectively associated with the plurality of target second member accounts by performing the following processing for each target second member account: invoking a machine learning model to perform recommendation parameter prediction processing based on feature information of the target second member account (for example, feature information of a virtual object controlled by the target second member account, including a status value of the virtual object, a skill owned by the virtual object, and a function of the virtual object in a camp or team), feature information of the virtual scene (for example, a map type and size of the virtual scene), and functions respectively owned by the plurality of target virtual items in the virtual scene, to obtain recommendation parameters (for example, click-through rates) respectively corresponding to the plurality of target virtual items; and transmitting the recommendation message carrying the obtaining entry of the target virtual item with the highest recommendation parameter (for example, a target virtual item with a highest click-through rate) to the second terminal device associated with the target second member account.

An example process of training the machine learning model is described in detail below.

In some arrangements, a server may invoke an initialized machine learning model to perform prediction processing based on feature information of a sample second member account, feature information of a sample virtual scene, and functions respectively owned by a plurality of sample virtual items in the sample virtual scene, to obtain a recommendation parameter respectively corresponding to each sample virtual item; and then may substitute the recommendation parameter of the sample virtual item and marking data of the sample virtual item into a loss function for back propagation processing, and update a parameter of the machine learning model during the back propagation processing, to obtain a trained machine learning model. Subsequently, the server may transmit the trained machine learning model to the first terminal device.

The following continues to describe the loss function used in the example process of training the machine learning model.

According to one or more aspects, various different types of loss functions may be used to train the machine learning model, which include: for example, a regression loss function, a two-classification loss function, a Hinge loss, a multi-classification loss function, and a multi-classification cross-entropy loss.

For example, the multi-classification cross-entropy loss may be a generalization of a binary cross-entropy loss. For an input vector $X_i$ and a corresponding target vector $Y_i$ obtained through one-hot encoding, a loss may be determined as follows:

$$L(X_i, Y_i) = -\sum_{j=1}^{c} y_{ij} * \log(p_{ij}) \quad (1)$$

$p_{ij}$ represents embedding of a one-hot encoding vector of the feature information of the sample second member account, the feature information of the sample virtual scene, and the function owned by the sample virtual item, and $y_{ij}$ represents the recommendation parameter (for example, a click-through rate) of the sample virtual item predicted based on the machine learning model.

For example, the Hinge loss may be mainly configured for a support vector machine with class labels (for example, including 1 and 0, where 1 represents being used and 0 represents being not used). For example, a formula for calculating a Hinge loss of a data pair (x, y) is as follows:

$$L = \max(0, 1 - y * f(x)) \quad (2)$$

y represents the marking data of the sample virtual item, and f(x) represents the click-through rate of the sample virtual item predicted based on the machine learning model. The Hinge loss maximizes a loss while simplifying a mathematical operation of the support vector machine.

The following continues to describe an example structure of the machine learning model.

In some arrangements, an exemplary structure of the machine learning model may include: an input layer (namely, an embedding layer), an encoding layer (for example, may be formed by a plurality of cascaded convolutional layers), a fully connected layer, and an output layer (including an activation function such as a Softmax function). For example, the feature information of the target second member account, the feature information of the virtual scene, and the functions respectively owned by the plurality of target virtual items in the virtual scene may be inputted into the input layer for embedding processing. Then, encoding processing may be performed on an embedding feature vector outputted by the input layer through the encoding layer, to obtain a hidden layer feature vector. Subsequently, full connection processing may be performed on the hidden layer feature vector through the fully connected layer. Finally, a full connection result outputted by the fully connected layer may be inputted into the output layer, to perform activation processing through the output layer, to obtain the recommendation parameters respectively corresponding to the plurality of target virtual items.

The machine learning model may be a neural network model (for example, a convolutional neural network, a deep convolutional neural network, or a fully connected neural network), a decision tree model, a gradient boosting tree, a multilayer perceptron, a support vector machine, or the like. A type of the machine learning model is not limited to these examples.

In some examples, the recommendation message may further carry at least one of the following information: the first member account, or qualification for using the at least one target virtual item (for example, a quantity of virtual resources required to be consumed to purchase the at least one target virtual item, or a level or historical record required to use the at least one target virtual item). For example, when a level of a member account reaches level 10, the at least one target virtual item can be used, or when a win rate of the member account reaches 80%, the at least one target virtual item can be used.

Operation 104: The second terminal device displays at least one recommendation message transmitted by at least one first member account in the virtual scene.

In some arrangements, when the at least one recommendation message includes a plurality of recommendation messages respectively transmitted by a plurality of first member accounts, the second terminal device may implement operation 104 in the following manner: perform one of the following processing: displaying the plurality of recommendation messages respectively transmitted by the plurality of first member accounts at a time; or storing the plurality of recommendation messages respectively transmitted by the plurality of first member accounts in a queue in order of receiving time, displaying a recommendation message with earliest receiving time in the queue, and switching to display a next recommendation message in the queue in response to the display duration of the recommendation message with the earliest receiving time being greater than a set display duration threshold (for example, assumed as three seconds) or a trigger operation on the obtaining entry carried in the recommendation message with the earliest receiving time is received.

Figure 4C:
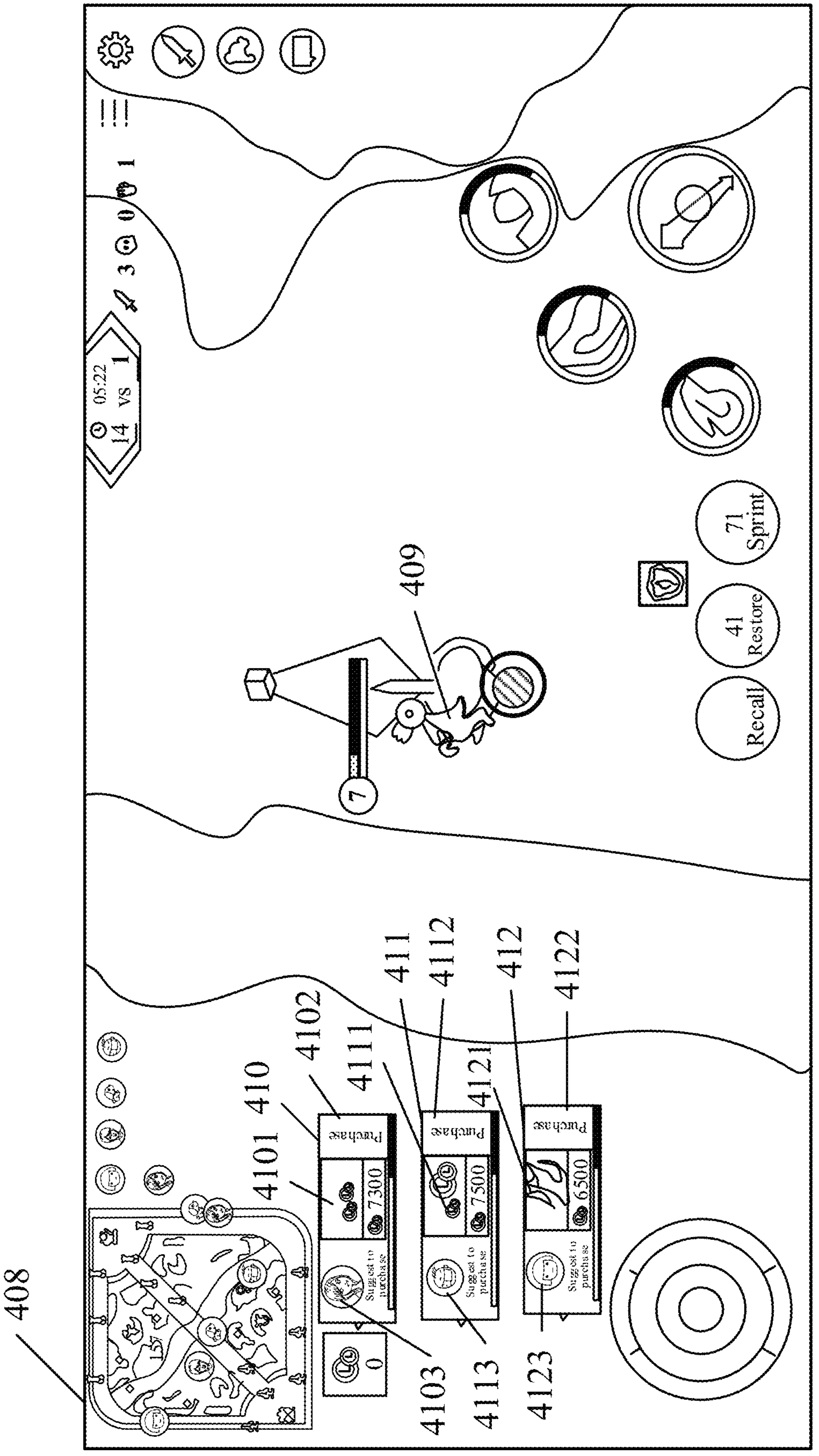

An example in which the second terminal device is a terminal device B associated with a player 2 is used in the following description. As shown in FIG. 4C, a virtual scene client is run on the terminal device B. The player 2 may log in to the virtual scene client by using a second member account (for example, a game account 2 pre-registered by the player 2), to display a virtual scene 408 on the terminal device B. A virtual object 409 controlled by the player 2 may be displayed in the virtual scene 408. Assuming that the terminal device B successively receives a plurality of recommendation messages respectively transmitted by a plurality of first member accounts within set duration (for example, 30 seconds), the plurality of recommendation messages respectively transmitted by the plurality of first member accounts may be displayed at one time (e.g., at the same time) in the virtual scene 408, which include: for example, a recommendation message 410 transmitted by a player 1 through a terminal device A, where the recommendation message 410 carries a purchase entry 4102 corresponding to a virtual item 4101 selected by the player 1 in a virtual store (where the recommendation message 410 may further carry an avatar of a virtual object controlled by a first member account that transmits the recommendation message 410, for example, an avatar 4103 of a virtual object controlled by the player 1, to inform the player 2 of who recommends the virtual item 4101); a recommendation message 411 transmitted by a player 3 through a terminal device C, where the recommendation message 411 carries a purchase entry 4112 corresponding to a virtual item 4111 selected by the player 3 in the virtual store (where the recommendation message 411 may further carry an avatar 4113 of a virtual object controlled by the player 3, to inform the player 2 of who recommends the virtual item 4111); and a recommendation message 412 transmitted by a player 4 through the terminal device D, where the recommendation message 412 carries a purchase entry 4122 corresponding to a virtual item 4121 selected by the player 4 in the virtual store (where the recommendation message 412 may further carry an avatar 4123 of a virtual object controlled by the player 4, to inform the player 2 of who recommends the virtual item 4121). In this way, the recommendation messages respectively transmitted by the plurality of first member accounts are displayed at one time in the virtual scene, so that a receiver can more effectively purchase a correct virtual item in a game, thereby improving a game experience of the player.

The plurality of recommendation messages may alternatively be switched to be displayed in the virtual scene. In other words, only one recommendation message may be displayed at a time. When display duration of the recommendation message is greater than the display duration threshold (for example, three seconds), or when a trigger operation by the player on an obtaining entry carried in the recommendation message is received, or when a close operation on the recommendation message is received, a next recommendation message may then displayed (e.g., instead of the prior recommendation message). A display manner of the plurality of recommendation messages in the virtual scene is not limited to these examples.

Figure 4D:
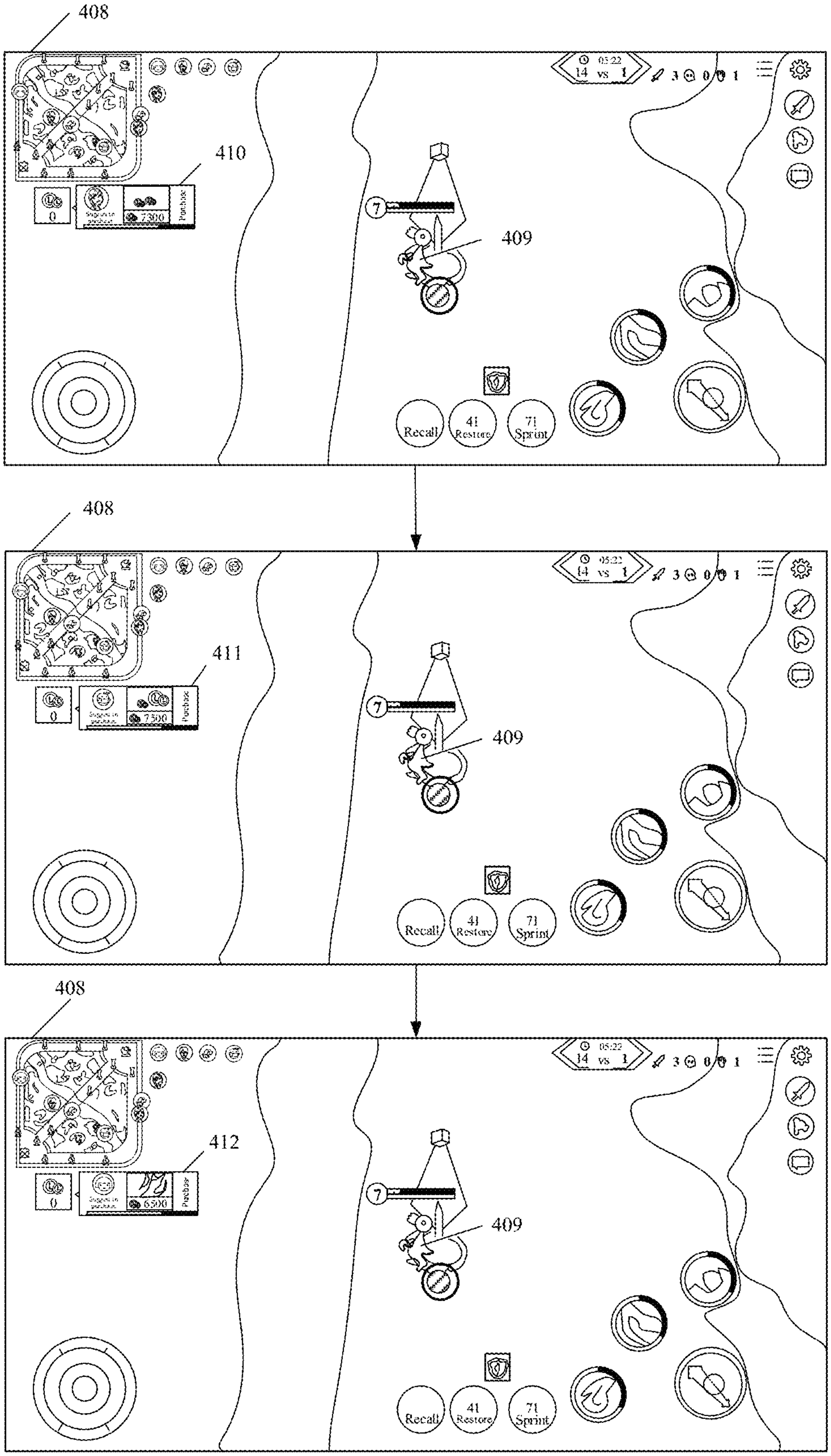

An example in which the second terminal device is a terminal device B associated with a player 2 is used in the following description. As shown in FIG. 4D, a virtual scene client is run on the terminal device B. The player 2 may log in to the virtual scene client by using a second member account (for example, a game account 2 pre-registered by the player 2), to display a virtual scene 408 on the terminal device B. A virtual object 409 controlled by the player 2 may be displayed in the virtual scene 408. Assuming that the terminal device B successively receives a plurality of recommendation messages respectively transmitted by a plurality of first member accounts within set duration (for example, 30 seconds), the terminal device B may store the plurality of recommendation messages in a queue in order of receiving time, and first read a recommendation message with earliest receiving time from the queue for display. For example, a recommendation message 410 transmitted by a player 1 through a terminal device A may be displayed in the virtual scene 408 (in other words, the recommendation message 410 is the recommendation message with the earliest receiving time in the plurality of recommendation messages), and when display duration of the recommendation message 410 exceeds the set display duration threshold (for example, three seconds) or when a tap operation by the player 2 on a purchase entry carried in the recommendation message 410 is received, a recommendation message located after the recommendation message 410 in the queue may be switched to be displayed in the virtual scene 408, for example, a recommendation message 411 transmitted by a player 3 through a terminal device C may be switched to be displayed in the virtual scene 408. Subsequently, when display duration of the recommendation message 411 is greater than three seconds or when a tap operation by the player 2 on a purchase entry carried in the recommendation message 411 is received, a recommendation message located after the recommendation message 411 in the queue, for example, a recommendation message 412 transmitted by a player 4 through a terminal device D, may be switched to be displayed. In this way, only one recommendation message is displayed at time, so that interference to a normal game process of the player due to an excessive quantity of displayed recommendation messages is avoided while a recommendation requirement is met.

In some other arrangements, before displaying the recommendation message carrying the obtaining entry corresponding to the at least one target virtual item, the second terminal device may further perform the following processing: transferring, in response to the second member account currently having qualification for using the at least one target virtual item, to the processing of displaying the recommendation message carrying the obtaining entry corresponding to the at least one target virtual item; and displaying, in response to that the second member account currently having no qualification for using the at least one target virtual item, a recommendation message carrying a pre-obtaining entry corresponding to the at least one target virtual item, to replace displaying the recommendation message carrying the obtaining entry corresponding to the at least one target virtual item.

For example, the use qualification may be that a quantity of virtual resources (for example, virtual coins or virtual golds) currently owned by a member account is required to be greater than a set quantity threshold, where the quantity threshold is a quantity of virtual resources required to be consumed to purchase the at least one target virtual item. In this case, the second terminal device may further perform the following processing: canceling, in response to a trigger operation on the pre-obtaining entry (for example, a pre-purchase entry), the displaying of the recommendation message, and displaying the at least one target virtual item in the virtual scene; and equipping, in response to a trigger operation on the at least one target virtual item displayed in the virtual scene and in response to a quantity of virtual resources owned by the second member account being greater than the quantity of virtual resources required to be consumed to purchase the at least one target virtual item, the at least one virtual object controlled by the second member account with the at least one target virtual item after the quantity of virtual resources corresponding to the second member account is successfully deducted.

In some other examples, the second terminal device may further perform the following processing: displaying, during displaying of each recommendation message, the first member account that transmits the recommendation message (for example, displaying at least one of an avatar or a name of the first member account, or displaying at least one of an avatar or a name of a virtual object controlled by the first member account), and a countdown control; and canceling the displaying of the recommendation message in response to a countdown of the countdown control ending or a trigger operation on the obtaining entry carried in the recommendation message being received.

Figure 4E:
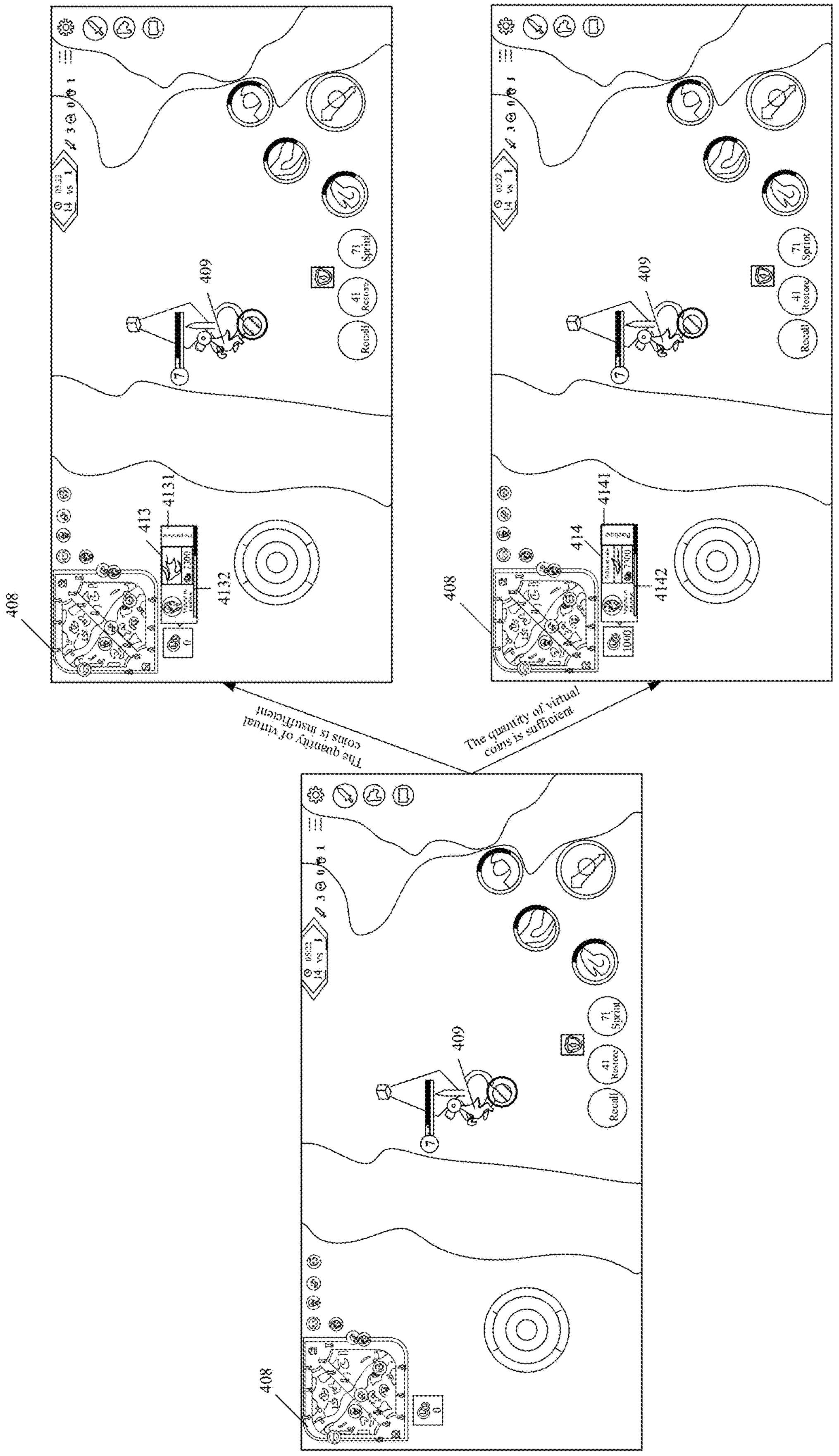

An example in which the second terminal device is the terminal device B associated with the player 2 is used in the following description. FIG. 4E is a schematic diagram of an example application scenario of an interaction processing method in a virtual scene. As shown in FIG. 4E, the virtual object 409 controlled by the player 2 may be displayed in the virtual scene 408. It is assumed that the terminal device B receives a recommendation message transmitted by the player 1 through the terminal device A, where the recommendation message carries a target virtual item (for example, assumed as a virtual item A) selected by the player 1 in the virtual store. In this case, after receiving the recommendation message transmitted by the terminal device A, the terminal device B may first determine whether a quantity of virtual coins currently owned by a member account (for example, a game account 2 pre-registered by the player 2) associated with the player 2 in the virtual scene 408 is sufficient (that is, whether the quantity of virtual coins currently owned by the game account 2 is greater than a quantity of virtual coins required to be consumed to purchase the virtual item A). When the quantity of virtual coins currently owned by the game account 2 is less than the quantity of virtual coins required to be consumed to purchase the virtual item A (that is, the quantity of virtual coins currently owned by the game account 2 is insufficient), a recommendation message 413 carrying a pre-purchase entry 4131 may be displayed in the virtual scene 408, where the recommendation message 413 may further carry a countdown control 4132. When a countdown of the countdown control 4132 ends or when a tap operation by the player 2 on the pre-purchase entry 4131 is received, the displaying of the recommendation message 413 may be canceled, and the virtual item A is displayed in the virtual scene 408. In this way, when the player 2 owns a sufficiently large quantity of virtual coins, the player 2 may directly perform purchasing by taping on the virtual item A displayed in the virtual scene 408. When the quantity of virtual coins currently owned by the game account 2 is sufficient (that is, the quantity of virtual coins currently owned by the game account 2 is greater than the quantity of virtual coins required to be consumed to purchase the virtual item A), a recommendation message 414 carrying a purchase entry 4141 may be displayed in the virtual scene 408, where the recommendation message 414 may further carry a countdown control 4142. When a countdown of the countdown control 4142 ends, the displaying of the recommendation message 414 may be canceled; or when a tap operation by the player 2 on the purchase entry 4141 is received, the virtual object 409 controlled by the player 2 may be equipped with the virtual item A.

Operation 105: The second terminal device equips, in response to a trigger operation on the obtaining entry in the at least one recommendation message, at least one virtual object controlled by the second member account with the at least one target virtual item.

An example in which the second terminal device is the terminal device B associated with the player 2 is used in the following description. A virtual scene may be displayed on the terminal device B. A virtual object (for example, a virtual object A) controlled by the player 2 and at least one recommendation message transmitted by at least one first member account may be displayed in the virtual scene. For example, the player 1 may transmit a recommendation message 1 through the terminal device A, where the recommendation message 1 may carry an obtaining entry corresponding to the target virtual item (for example, assumed as the virtual item A) selected by the player 1 from the virtual item warehouse. When a tap operation by the player 2 on the obtaining entry corresponding to the virtual item A carried in the recommendation message 1 is received, the virtual object A controlled by the player 2 may be equipped with the virtual item A. For example, the obtaining entry may be a purchase entry. After the quantity of virtual coins corresponding to the game account 2 associated with the player 2 is successfully deducted, the virtual object A controlled by the player 2 may be equipped with the virtual item A.

According to the interaction processing method in a virtual scene described herein, after a target virtual item that needs to be recommended is selected from a virtual item warehouse, at least one second member account to which a recommendation is to be made may be displayed in an adjacent area of the target virtual item; and subsequently, after a target second member account to which a recommendation is to be made is selected, a recommendation message carrying an obtaining entry corresponding to the target virtual item may be transmitted to the target second member account. In this way, a player associated with the target second member account can quickly equip a virtual object controlled by the player with the target virtual item through the obtaining entry, thereby improving recommendation efficiency and equipping efficiency for a virtual item, and further improving a game experience of the player. In addition, because time consumed by the player to find the target virtual item from the virtual item warehouse is reduced, the game process may be accelerated, so that resource overhead of a terminal device and a server can be effectively reduced.

The following describes an exemplary application using a multiplayer online battle arena game as an example.

In a multiplayer online battle arena game, a virtual item (for example, virtual equipment, referred to as equipment for short hereinafter) in the game may be a very core set of functions, and proper equipment building can achieve twice the result with half the effort. Proper equipment building can bring a team win, and some mechanisms in the game may require game characters controlled by players to wear corresponding equipment. For example, when an opponent camp or team has a restoration-type game character (or champion), a current camp or team may need to purchase equipment for reducing restoration. This is also one of skills in the game.

However, because different players have different understanding for equipment, novice players might not be familiar with the equipment in the game, and the like. As a result, some players cannot or might not purchase proper equipment, and there is a requirement that a player needs to inform another player of equipment that needs to be purchased. In the related art, the foregoing requirement is usually completed by a player through typing or voice communication, which is inefficient and has strong limitations. For example, even though a novice player is informed of equipment that needs to be purchased, the novice player may not find a specific position of the equipment in the game (e.g., within an item warehouse or menu) because the novice player is unfamiliar with the game.

In view of this, aspects described herein provide an interaction processing method in a virtual scene. In a game, an initiator (for example, a player 1) may find corresponding equipment in a virtual store and transmit the equipment to a corresponding receiver (for example, a player 2). After receiving a recommendation suggestion (corresponding to the foregoing recommendation message) transmitted by the player 1, the player 2 may perform one-click pre-purchasing. For example, when a tap operation by the player 2 on a pre-purchase entry carried in the recommendation suggestion transmitted by the player 1 is received, the equipment may become pre-purchased equipment of the player 2 (for example, the equipment may be directly displayed on a main interface). In this way, one-click recommendation and one-click pre-purchasing for the equipment can be performed between the initiator and the receiver, thereby forming a closed loop, and improving a success rate of the player in purchasing proper equipment in the game.

The following describes in detail an interaction processing method in a virtual scene.

Figure 6:
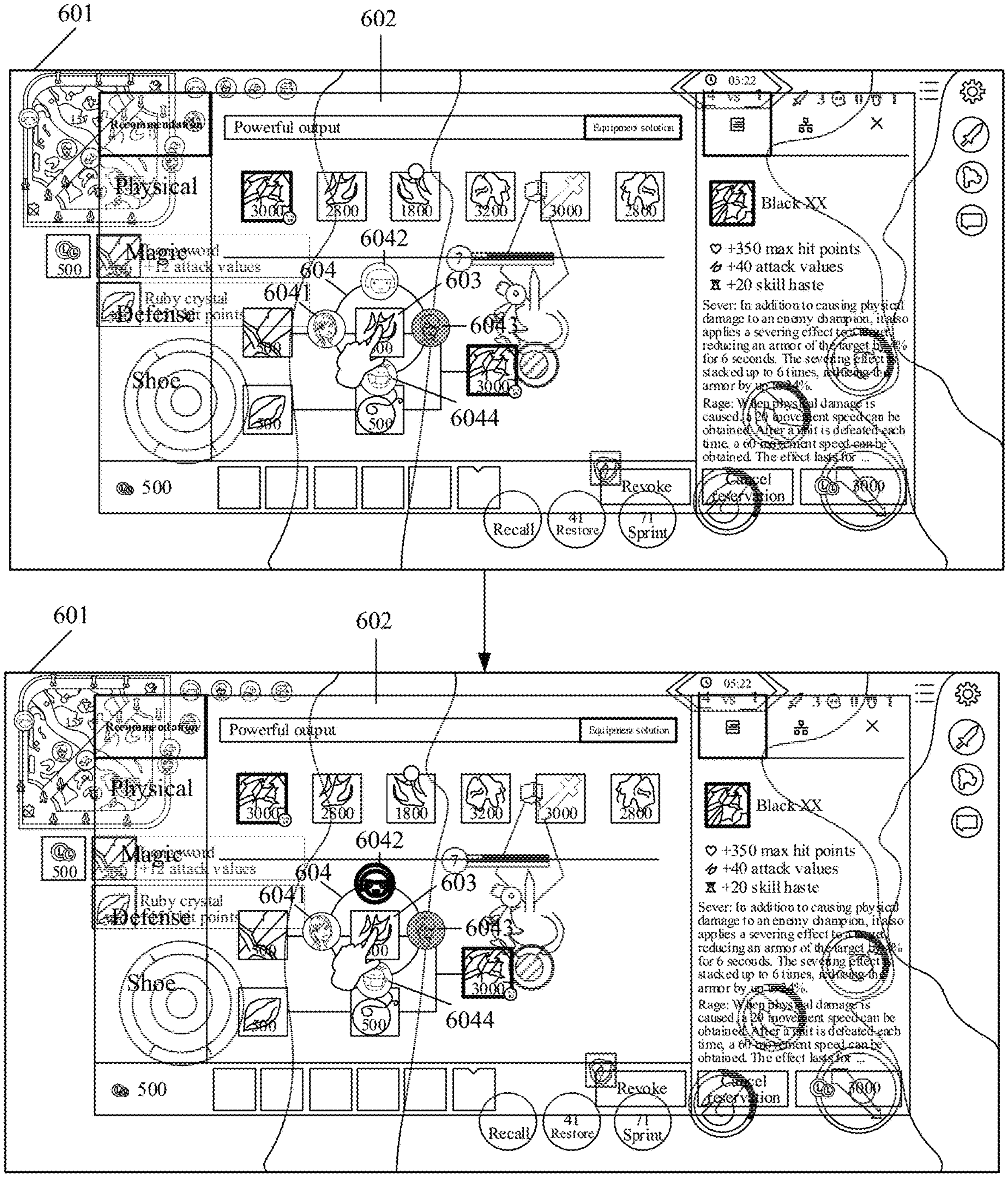
FIG. 6 is a schematic diagram of an example application scenario of an interaction processing method in a virtual scene according to one or more aspects described herein.

An example in which a transmitter is a player 1 is used in the following description. FIG. 6 is a schematic diagram of an example application scenario of an interaction processing method in a virtual scene. As shown in FIG. 6, when a battle starts, assuming that a trigger operation by the player 1 on a virtual store entry is received, a virtual store interface 602 may be displayed in a virtual scene 601. Subsequently, when a long-press operation by the player 1 on an icon (for example, an icon 603 of equipment A) of specific equipment displayed in the virtual store interface 602 is received, a wheel 604 may be displayed in an adjacent area of the icon 603, and avatars of game characters respectively controlled by a plurality of teammates participating in the same battle are displayed in the wheel 604, which include: for example, an avatar 6041 of a game character B controlled by a teammate 1, an avatar 6042 of a virtual object C controlled by a teammate 2, an avatar 6043 of a virtual object D controlled by a teammate 3, and an avatar 6044 of a virtual object E controlled by a teammate 4. The player may slide a finger to move to a hot zone corresponding to an avatar, to indicate selection. After the player releases the finger, the procedure is ended, and a cool down state is entered. The player 1 may be referred to as a transmitter of a recommendation message.

Positions of the plurality of avatars in the wheel may be filled with specific priorities according to positions of the teammates. As shown in FIG. 7, it is assumed that a game character A controlled by the player 1 in the game plays an ADC. In this case, in a field of view of the player 1, in FIG. 7, a position 1 corresponds to a top, a position 2 may correspond to a mid, a position 3 may correspond to a jungler, and a position 4 may correspond to a support. In other words, filling may be performed according to priorities of positions of the game characters in the game. For example, filling is performed according to ascending order of serial numbers. The game character controlled by the player 1 may be removed before filling.

In addition, if a game character controlled by a player has owned equipment 603 or the equipment 603 cannot be purchased due to a game mechanism, gray processing may be performed on an avatar of the game character controlled by the player, to indicate that the avatar cannot be selected. For example, assuming that a game character D controlled by teammate 3 has owned the equipment 603, gray processing may be performed on the avatar 6043. In addition, an avatar selected by the player 1 may be displayed in a highlighting manner. For example, assuming that the player 1 slides the finger to a hot zone corresponding to the avatar 6042 of the virtual object C controlled by the teammate 2, the avatar 6042 may be displayed in the highlighting manner, to indicate that the avatar 6042 is currently in a selected state.

In some other examples, when a player (for example, assumed as a player 1) becomes an initiator, a corresponding selected player (for example, assumed as a player 2) becomes a receiver. As shown in FIG. 8A, when a recommendation message transmitted by the player 1 is received, a terminal device (for example, a mobile phone) associated with the player 2 may first determine whether a quantity of virtual coins currently owned by the player 2 is greater than a quantity of virtual coins required to be consumed to purchase equipment (for example, assumed as equipment A) recommended by the player 1. When the quantity of virtual coins currently owned by the player 2 is less than the quantity of virtual coins required to be consumed to purchase the equipment A recommended by the player 1, a recommendation message 802 carrying a pre-purchase entry 8021 may be displayed in a virtual scene 801. An icon 8022 of the equipment A, an avatar 8023 of a game character controlled by the player 1 (that is, an avatar of the initiator), and a quantity 8024 of virtual coins required to be consumed to purchase the equipment A may further be displayed in the recommendation message 802. In addition, a countdown control 8025 is further displayed in the recommendation message 802. When a countdown (for example, three seconds) displayed in the countdown control 8025 ends or when a tap operation by the player 2 on the pre-purchase entry 8021 is received, the displaying of the recommendation message 802 in the virtual scene 801 may be canceled, and the icon 8022 of the equipment A may be displayed in the virtual scene 801 (in other words, in this case, the equipment A is equipment pre-purchased by the player 2). When the quantity of virtual coins owned by the player 2 is greater than the quantity of virtual coins required to be consumed to purchase the equipment A, purchasing may be directly performed by tapping on the icon 8022 of the equipment A displayed in the virtual scene 801.

Figure 8B:
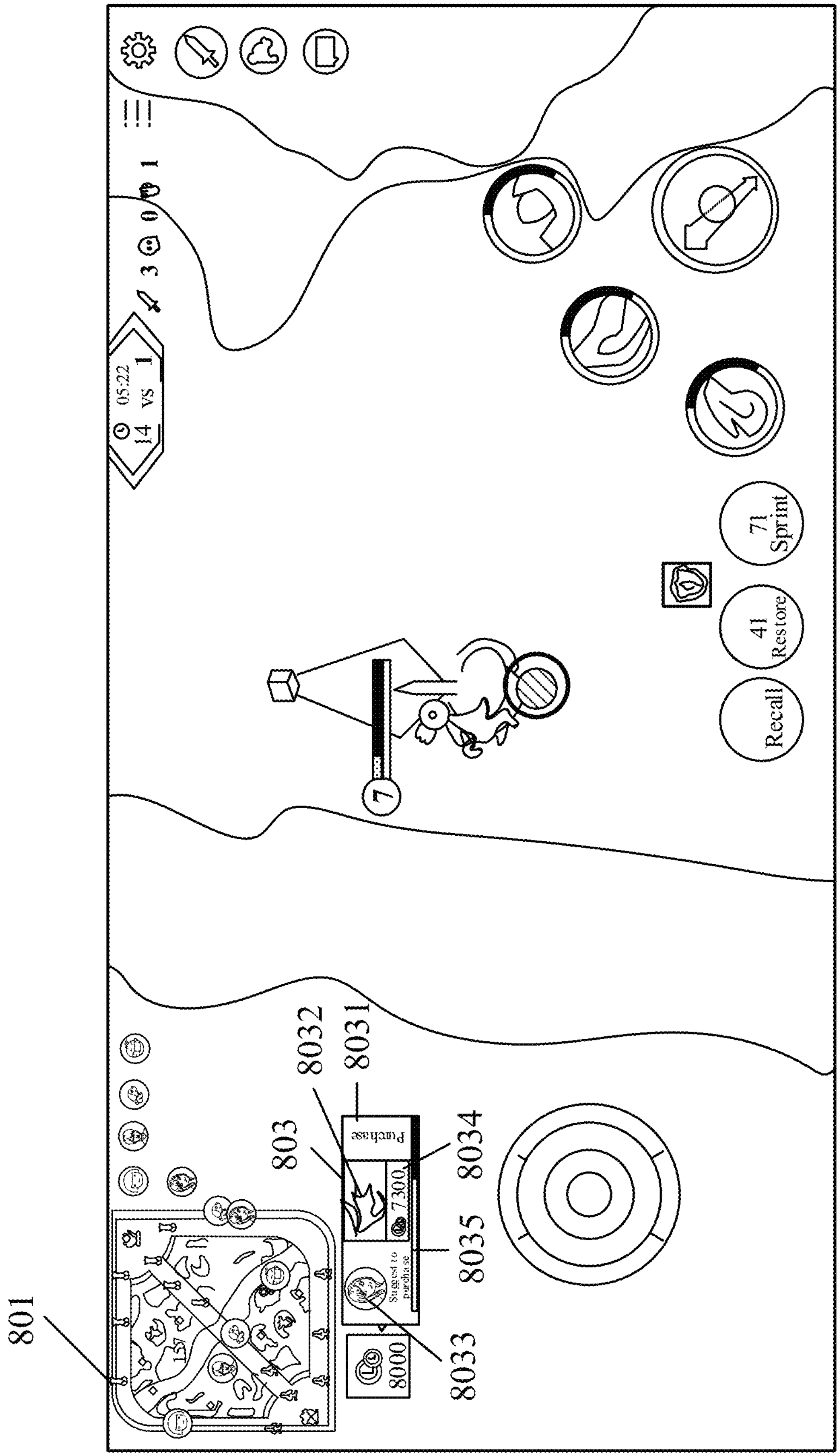

In some other arrangements, based on the foregoing example, as shown in FIG. 8B, when the quantity of virtual coins currently owned by the player 2 is greater than the quantity of virtual coins required to be consumed to purchase the equipment A recommended by the player 1, a recommendation message 803 carrying a purchase entry 8031 may be displayed in the virtual scene 801. An icon 8032 of the equipment A, an avatar 8033 of a game character controlled by the player 1 (that is, an avatar of the initiator), and a quantity 8034 of virtual coins required to be consumed to purchase the equipment A may further be displayed in the recommendation message 803. In addition, a countdown control 8035 may be further displayed in the recommendation message 803. When a countdown (for example, three seconds) displayed in the countdown control 8035 ends, the displaying of the recommendation message 803 in the virtual scene 801 may be canceled; or when a tap operation by the player 2 for the purchase entry 8031 is received, the equipment A may be directly purchased for a game character (for example, a game character B) controlled by the player 2.

Figure 9:
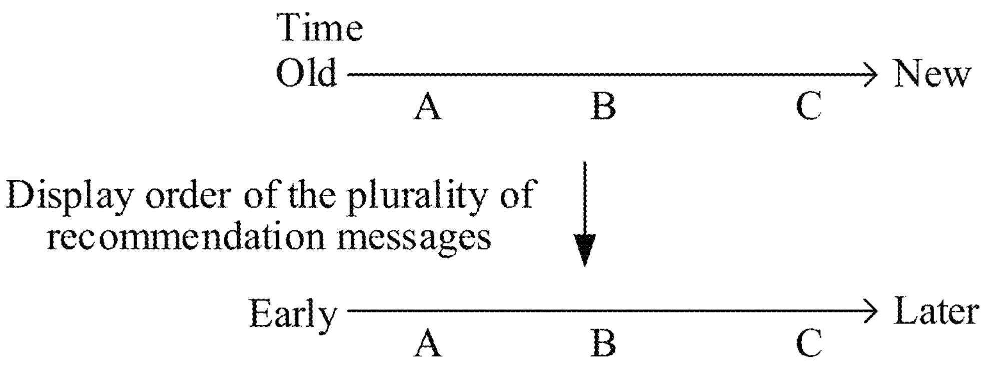
FIG. 9 is a schematic diagram of an example display switching principle of a plurality of recommendation messages according to one or more aspects described herein.

In some examples, as shown in FIG. 9, if a plurality of initiators transmit recommendation messages to the same receiver, for example, assuming that a player A, a player B, and a player C successively transmit recommendation messages to a player D, a plurality of recommendation messages may be stored in a queue in order of receiving time. Subsequently, the plurality of recommendation messages stored in the queue may be sequentially displayed based on a first-in-first-out principle. In other words, a new or subsequent recommendation message is displayed only after an old or previous recommendation message is closed. For example, a recommendation message transmitted by the player B may be displayed only after a recommendation message transmitted by the player A is closed.

The interaction processing method in a virtual scene may be mainly divided into two parts: equipment suggestion initiation of an initiator, and displaying of a recommendation message (TIPS) and pre-purchasing of equipment of a receiver. The two might not affect each other. The following separately describes each function.

The following first describes a process in which an initiator transmits an equipment suggestion.

Figure 10:
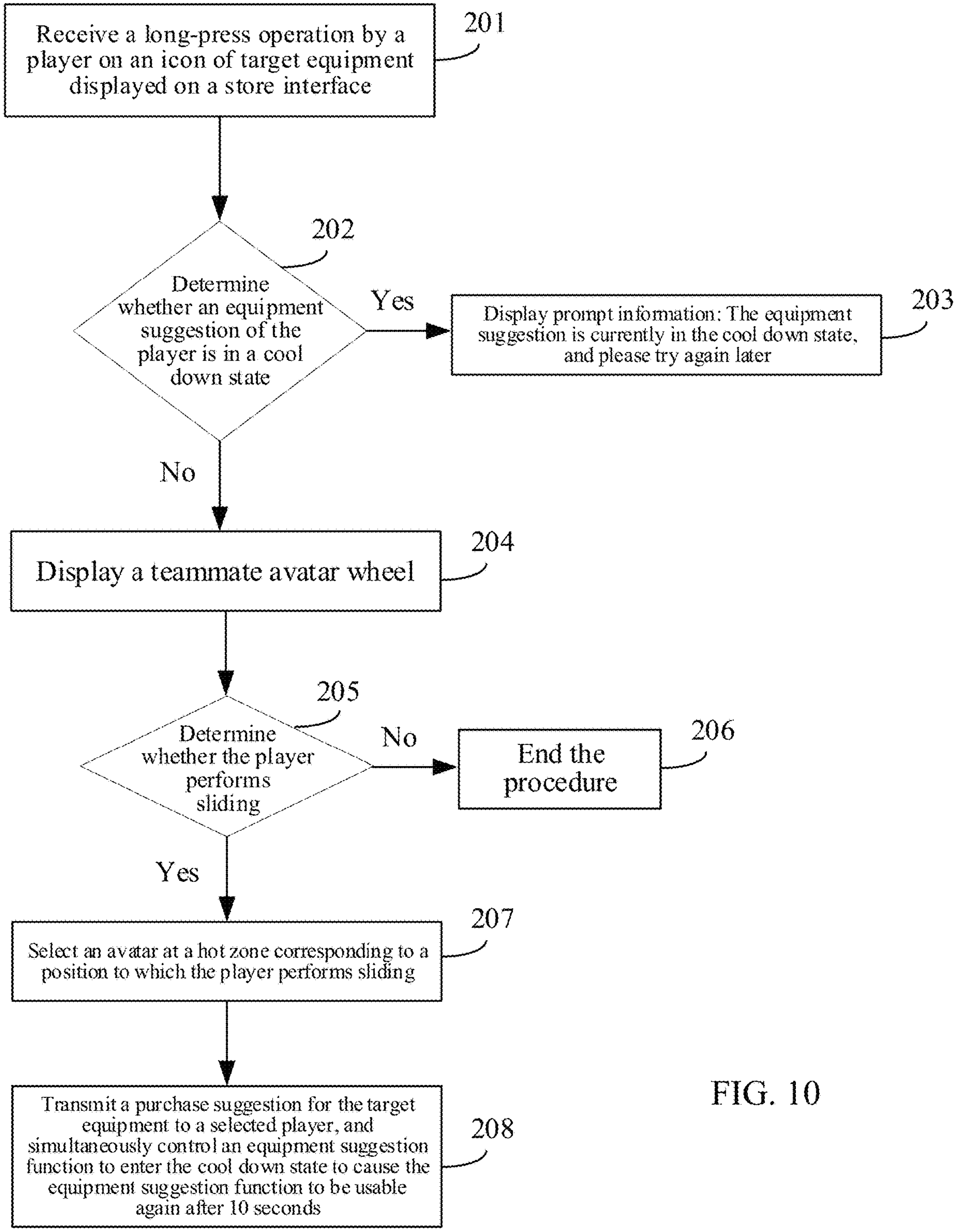
FIG. 10 is a schematic flowchart of an example interaction processing method in a virtual scene according to one or more aspects described herein.

FIG. 10 is a schematic flowchart of an example interaction processing method in a virtual scene according to one or more aspects described herein. Descriptions are made with reference to operations shown in FIG. 10.

Operation 201: Receive a long-press operation by a player on an icon of target equipment displayed on a store interface.

Operation 202: Determine whether an equipment suggestion of the player is in a cool down state; and perform operation 203 if the equipment suggestion of the player is in the cool down state; or perform operation 204 if the equipment suggestion of the player is not in the cool down state.

In some arrangements, when a player opens a virtual store interface in a game and long-presses an icon of specific equipment, it is first determined whether an equipment suggestion function of the player is in the cool down state. If the equipment suggestion function of the player is in the cool down state, prompt information may be displayed to prompt or indicate to the player, for example, that the equipment suggestion function is currently in the cool down state, and to please try again later; and the procedure is ended. If the equipment suggestion function of the player is not in the cool down state, a teammate avatar wheel may be called out (e.g., displayed) in an adjacent area of the equipment.

Operation 203: Display prompt information: The equipment suggestion is currently in the cool down state, and please try again later.

Operation 204: Display a teammate avatar wheel.

In some arrangements, the teammate avatar wheel may be displayed in the following manner: determining line positions of teammates, and filling avatars (referred to as teammate avatars for short) of game characters controlled by the teammates in corresponding wheel positions according to position priorities. In addition, it may be further determined whether a teammate has purchased the equipment or the teammate cannot purchase the equipment. If the teammate has not purchased the equipment and the teammate can purchase the equipment, an avatar of a game character controlled by the teammate may be normally displayed, to indicate that the avatar may be selected. If the teammate has purchased the equipment or the teammate cannot purchase the equipment due to a limitation of a game mechanism, gray processing may be performed on the avatar of the game character controlled by the teammate, to indicate that the avatar cannot be selected.

Operation 205: Determine whether the player performs sliding; and perform operation 206 if the player does not perform sliding; or perform operation 207 if the player performs sliding.

Operation 206: End the procedure.

Operation 207: Select an avatar at a hot zone corresponding to a position to which the player performs sliding.

Operation 208: Transmit a purchase suggestion for the target equipment to a selected player, and simultaneously control an equipment suggestion function to enter the cool down state to cause the equipment suggestion function to be usable again after 10 seconds.

In some example, after the teammate avatar wheel is called out, it may be further determined whether the player performs a slide gesture operation. If the player performs the slide gesture operation, a hot zone slided to by the player needs to be determined, to select a teammate avatar corresponding to the hot zone. Subsequently, it is determined in real time whether the player releases a finger. If the player releases the finger, it needs to be determined whether the player selects the teammate avatar. If the player selects the teammate avatar, after the purchase suggestion of the equipment is successfully transmitted to the corresponding player, the equipment suggestion function enters the cool down state, and the equipment suggestion function can be used again after 10 seconds (for example). In this case, the procedure is ended.

The following continues to describe a process of the displaying of the recommendation message and the pre-purchasing of the equipment of the receiver.

Figure 11:
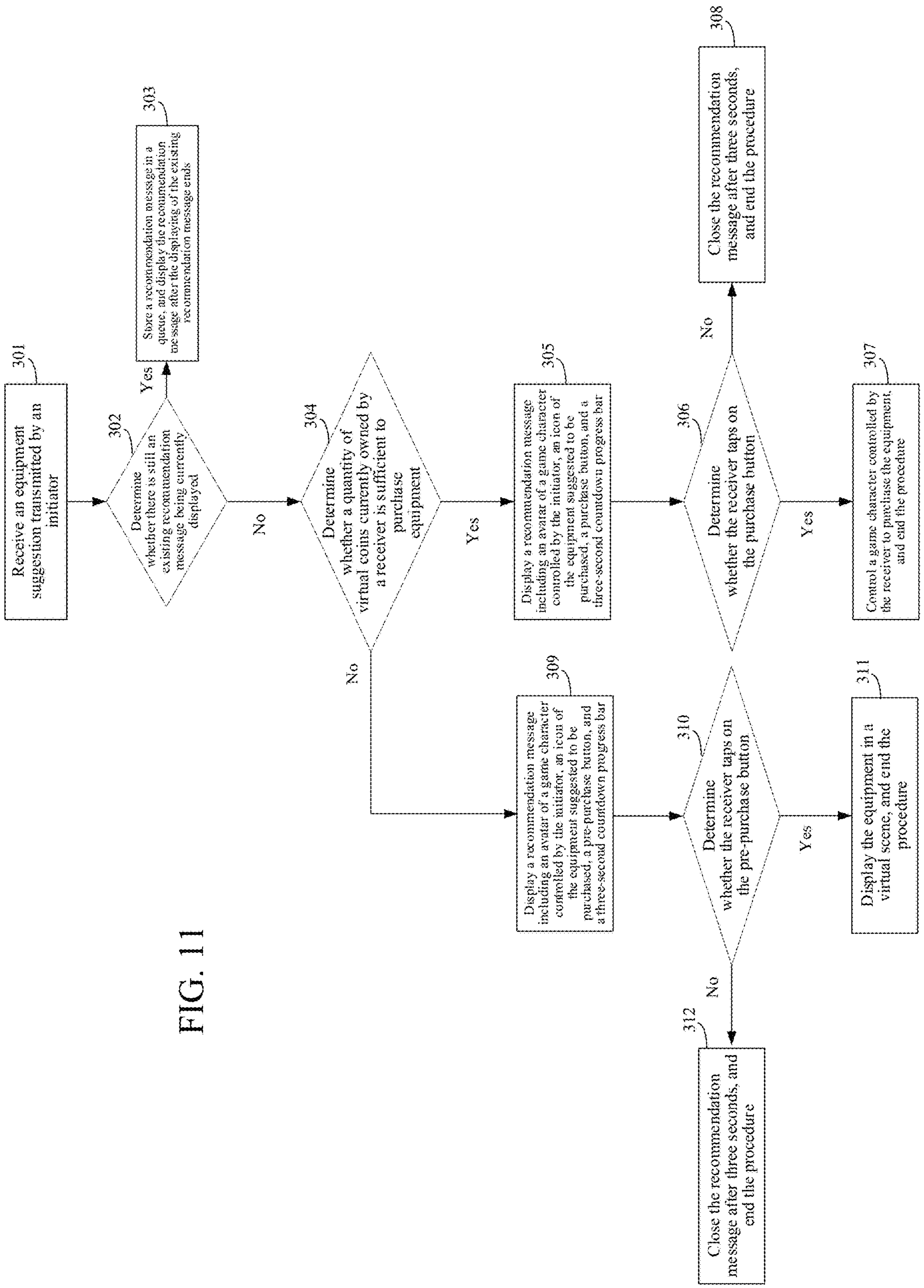
FIG. 11 is a schematic flowchart of an example interaction processing method in a virtual scene according to one or more aspects described herein.

FIG. 11 is a schematic flowchart of an interaction processing method in a virtual scene according to one or more aspects described herein. Descriptions are made with reference to operations shown in FIG. 11.

Operation 301: Receive an equipment suggestion transmitted by an initiator.

Operation 302: Determine whether there is still an existing recommendation message being currently displayed; and perform operation 303 if there is still the existing recommendation message being currently displayed; or perform operation 304 if there is no existing recommendation message being currently displayed.

Operation 303: Store a recommendation message in a queue, and display the recommendation message after the displaying of the existing recommendation message ends.

Operation 304: Determine whether a quantity of virtual coins currently owned by a receiver is sufficient to purchase equipment; and perform operation 305 if the quantity of virtual coins currently owned by the receiver is sufficient to purchase the equipment; or perform operation 309 if the quantity of virtual coins currently owned by the receiver is sufficient to purchase the equipment.

Operation 305: Display a recommendation message including an avatar of a game character controlled by the initiator, an icon of the equipment suggested to be purchased, a purchase button, and a 3-second countdown progress bar.

Operation 306: Determine whether the receiver taps on the purchase button; and perform operation 307 if the receiver taps on the purchase button; or perform operation 308 if the receiver does not tap on the purchase button.

Operation 307: Control a game character controlled by the receiver to purchase the equipment, and end the procedure.

Operation 308: Close the recommendation message after three seconds, and end the procedure.

Operation 309: Display a recommendation message including an avatar of a game character controlled by the initiator, an icon of the equipment suggested to be purchased, a pre-purchase button, and a three-second countdown progress bar.

Operation 310: Determine whether the receiver taps on the pre-purchase button; and perform operation 311 if the receiver taps on the pre-purchase button; or perform operation 312 if the receiver does not tap on the pre-purchase button.

Operation 311: Display the equipment in a virtual scene, and end the procedure.

Operation 312: Close the recommendation message after three seconds, and end the procedure.

In some examples, when an initiator initiates an equipment suggestion, it might need to be determined whether there is an existing recommendation message being displayed currently for a corresponding receiver. If there is an existing recommendation message being displayed currently, a recommendation message may be stored in the queue and displayed after the displaying of the existing recommendation message ends. If there is no existing recommendation message being still displayed currently, the recommendation message may be directly (e.g., immediately) displayed on a main interface of the receiver. The following describes a process of displaying the recommendation message.

For example, before displaying the recommendation message, it may be first determined whether a quantity of virtual coins currently owned by the receiver is sufficient to purchase the equipment. If the quantity of virtual coins currently owned by the receiver is not sufficient to purchase the equipment, a recommendation message including an avatar of a game character controlled by the initiator, an icon of the equipment suggested to be purchased, a pre-purchase button, and a 3-second countdown progress bar may be displayed. Other countdown time periods may be used. Subsequently, it may be further determined whether the receiver taps on the pre-purchase button. If the receiver does not tap on the pre-purchase button, the recommendation message may be closed after three seconds, and the entire procedure may be ended. If the receiver taps on the pre-purchase button, the receiver pre-purchases the equipment, and a recommendation corresponding to the equipment may be displayed in a gray processing manner. Unless the player pre-purchases another equipment, cancels the pre-purchase of the equipment, or purchases the equipment, the entire procedure may be terminated.

For example, if the quantity of virtual coins currently owned by the receiver is sufficient to purchase the equipment, a recommendation message including an avatar of a game character controlled by the initiator, an icon of the equipment suggested to be purchased, a purchase button, and a 3-second countdown progress bar may be displayed. Subsequently, it is further determined whether the receiver taps on the purchase button. If the receiver does not tap on the purchase button, the recommendation message may be closed after three seconds, and the entire procedure may be ended. If the receiver taps on the purchase button, the receiver purchases the equipment, and the procedure may be ended.

According to the interaction processing method in a virtual scene according to aspects described herein, two functions in which equipment is suggested to a teammate through long pressing and sliding, and in which the teammate may perform one-click pre-purchasing after the teammate receives the equipment suggestion are added in a battle. This resolves a problem that there is no way for a player to perform correction after finding that a teammate has improper equipment, and opens up a procedure of initiating, receiving and then pre-purchasing, thereby cutting off a break point, and making an operation by the player more efficient. The entire interaction process might only require two basic interactive gestures: long press and tap, and both a receiver and an initiator need only one operation to complete the procedure. This reduces a threshold of learning, ensures ease of use and precision of the function, improves a success rate of the player in purchasing proper equipment in a game, and can improve a win rate of the player in the entire game. In this way, game experience of the player is improved, and a game level of the player can be pulled up, thereby performing a benign loop on the game.

The following continues to describe an exemplary structure in which the interaction processing apparatus 465 in a virtual scene p is implemented as or with software modules. In some arrangements, as shown in FIG. 2A, the software modules of the interaction processing apparatus 465 in a virtual scene stored in the memory 460 may include the display module 4651 and the transmission module 4652.

The display module 4651 may be configured to display a virtual item warehouse logged in based on a first member account in a virtual scene, the virtual item warehouse including a plurality of virtual items. The display module 4651 may be further configured to display, in an adjacent area of at least one target virtual item in a selected state in response to an item selection operation, at least one second member account in the virtual scene, the second member account being any member account other than the first member account. The transmission module 4652 may be configured to transmit a recommendation message to selected at least one target second member account in response to a member account selection operation, the recommendation message carrying an obtaining entry corresponding to the at least one target virtual item in the virtual item warehouse.

In some arrangements, when the at least one second member account includes a plurality of second member accounts, the display module 4651 may be further configured to display the plurality of second member accounts in the virtual scene, the plurality of second member accounts being displayed in a specific sorting manner, and the sorting manner including: descending order of function priorities of the plurality of second member accounts in the virtual scene; descending order of interaction frequencies between the plurality of second member accounts and the first member account; order of moments when the plurality of second member accounts perform interaction with the first member account last time from a current moment from near to far; or descending order of levels of the plurality of second member accounts.

In some arrangements, the display module 4651 may be further configured to perform the following processing for each second member account: displaying the second member account in an untriggerable state in response to the second member account owning or having owned the at least one target virtual item or not having a qualification for using the at least one target virtual item; and displaying the second member account in a triggerable state in response to the second member account not owning or not having owned the at least one target virtual item and having a qualification for using the at least one target virtual item.

In some arrangements, the interaction processing apparatus 465 in a virtual scene may further include the obtaining module 4653 and the deletion module 4654, where the obtaining module 4653 may be configured to obtain a second member account having a social relationship with the first member account in the virtual scene; the deletion module 4654 may be configured to delete, from a plurality of second member accounts, a second member account that meets at least one of the following conditions: the second member account has owned or owns the at least one target virtual item, or the second member account does not have a qualification for using the at least one target virtual item; and the display module 4651 may be further configured to display remaining at least one second member account.

In some arrangements, the display module 4651 may be further configured to display prompt information in response to a time difference between a first moment and a second moment being less than a set time difference threshold, the prompt information being configured for prompting or notifying a user that an item recommendation function is currently in a cool down state; and the interaction processing apparatus 465 in a virtual scene may further include the transfer module 4655, configured to transfer to the processing of displaying at least one second member account in the virtual scene in response to that the time difference between the first moment and the second moment being greater than the set time difference threshold, the first moment being a moment when the recommendation message is transmitted last time, and the second moment being a moment when the item selection operation is received.

In some arrangements, a display manner of a virtual item recommended to the first member account may be different from a display manner of another virtual item in the virtual item warehouse, and the recommended virtual item may include at least one of the following: a virtual item of which a quantity of use times by the first member account is greater than a quantity threshold, or a virtual item collaboratively usable with a virtual item that has been owned by the first member account.

In some arrangements, when the at least one target virtual item includes a plurality of target virtual items and the at least one target second member account includes a plurality of target second member accounts, the transmission module 4652 may be further configured to perform one of the following processing: transmitting a same recommendation message to the plurality of target second member accounts, the recommendation message carrying obtaining entries respectively corresponding to the plurality of target virtual items in the virtual item warehouse; or transmitting a plurality of recommendation messages in a one-to-one correspondence to the plurality of target second member accounts, each recommendation message carrying an obtaining entry corresponding to one target virtual item in the virtual item warehouse.

In some examples, the interaction processing apparatus 465 in a virtual scene may further include the prediction module 4656, configured to perform the following processing for each target second member account: invoking a machine learning model to perform recommendation parameter prediction processing based on feature information of the target second member account, feature information of the virtual scene, and functions respectively owned by the plurality of target virtual items in the virtual scene, to obtain recommendation parameters respectively corresponding to the plurality of target virtual items; and the transmission module 4652 may be further configured to transmit the recommendation message carrying the obtaining entry of the target virtual item corresponding to the highest recommendation parameter to the target second member account.

In some examples, the recommendation message may further carry at least one of the following information: the first member account, or qualification for using the at least one target virtual item.

The following continues to describe an exemplary structure in which the interaction processing apparatus 565 in a virtual scene is implemented as or with software modules. In some examples, as shown in FIG. 2B, the software modules of the interaction processing apparatus 565 in a virtual scene stored in the memory 560 may include the display module 5651 and the equipping module 5652.

The display module 5651 may be configured to display a virtual scene, in which a second member account is logged into the virtual scene. The display module 5651 may be further configured to display at least one recommendation message transmitted by at least one first member account in the virtual scene, the recommendation message carrying an obtaining entry corresponding to at least one target virtual item in a virtual item warehouse, and the target virtual item being a virtual item selected by the first member account from the virtual item warehouse. The equipping module 5652 may be configured to equip, in response to a trigger operation on the obtaining entry in the at least one recommendation message, at least one virtual object controlled by the second member account with the at least one target virtual item.

In some arrangements, when the at least one recommendation message includes a plurality of recommendation messages respectively transmitted by a plurality of first member accounts, the display module 5651 may be further configured to display the plurality of recommendation messages respectively transmitted by the plurality of first member accounts one at a time. The interaction processing apparatus 565 in a virtual scene may further include the storage module 5653, the storage module 5653 configured to store the plurality of recommendation messages respectively transmitted by the plurality of first member accounts in a queue in order of receiving time; and the display module 5651 may be further configured to display the recommendation message with the earliest receiving time, and switch to displaying a next recommendation message in the queue in response to the display duration of the recommendation message with the earliest receiving time being greater than a set display duration threshold or a trigger operation on the obtaining entry carried in the recommendation message with the earliest receiving time being received.

In some arrangements, the interaction processing apparatus 565 in a virtual scene may further include the transfer module 5654, which may be configured to transfer, in response to that the second member account currently has qualification for using the at least one target virtual item, to the processing of displaying the recommendation message carrying the obtaining entry corresponding to the at least one target virtual item; and the display module 5651 may be further configured to display, in response to the second member account currently having no qualification for using the at least one target virtual item, a recommendation message carrying a pre-obtaining entry corresponding to the at least one target virtual item, to replace displaying the recommendation message carrying the obtaining entry corresponding to the at least one target virtual item.

In some examples, the use qualification includes requiring a quantity of virtual resources currently owned by a member account to be greater than a set quantity threshold, where the quantity threshold is a quantity of virtual resources required to be consumed to purchase the at least one target virtual item. The display module 5651 may be further configured to cancel, in response to a trigger operation on the pre-obtaining entry, the displaying of the recommendation message, and displaying the at least one target virtual item in the virtual scene; and the equipping module 5652 may be further configured to equip, in response to a trigger operation on the at least one target virtual item displayed in the virtual scene and in response to a quantity of virtual resources owned by the second member account being greater than the quantity of virtual resources required to be consumed to purchase the at least one target virtual item, the at least one virtual object controlled by the second member account with the at least one target virtual item after the quantity of virtual resources corresponding to the second member account is successfully deducted.

In some arrangements, the display module 5651 may be further configured to display, during displaying of each recommendation message, the first member account that transmits the recommendation message, and a countdown control; and cancel the displaying of the recommendation message in response to a countdown of the countdown control ending or a trigger operation on the obtaining entry carried in the recommendation message being received.

Descriptions of the apparatuses herein are similar to the descriptions of the foregoing methods, and have beneficial effects similar to those of the methods. Therefore, details are not described herein again. Technical details not mentioned in the interaction processing apparatus in a virtual scene may be understood according to descriptions of any one of FIG. 3 or FIG. 5.

Aspects further provide a computer program product, including computer programs or computer-executable instructions, the computer programs or the computer-executable instructions being stored in a computer-readable storage medium. A processor of a computer device reads the computer-executable instructions from the computer-readable storage medium, and executes the computer-executable instructions, to cause the computer device to perform the interaction processing method in a virtual scene according to aspects described herein.

Figure 5:
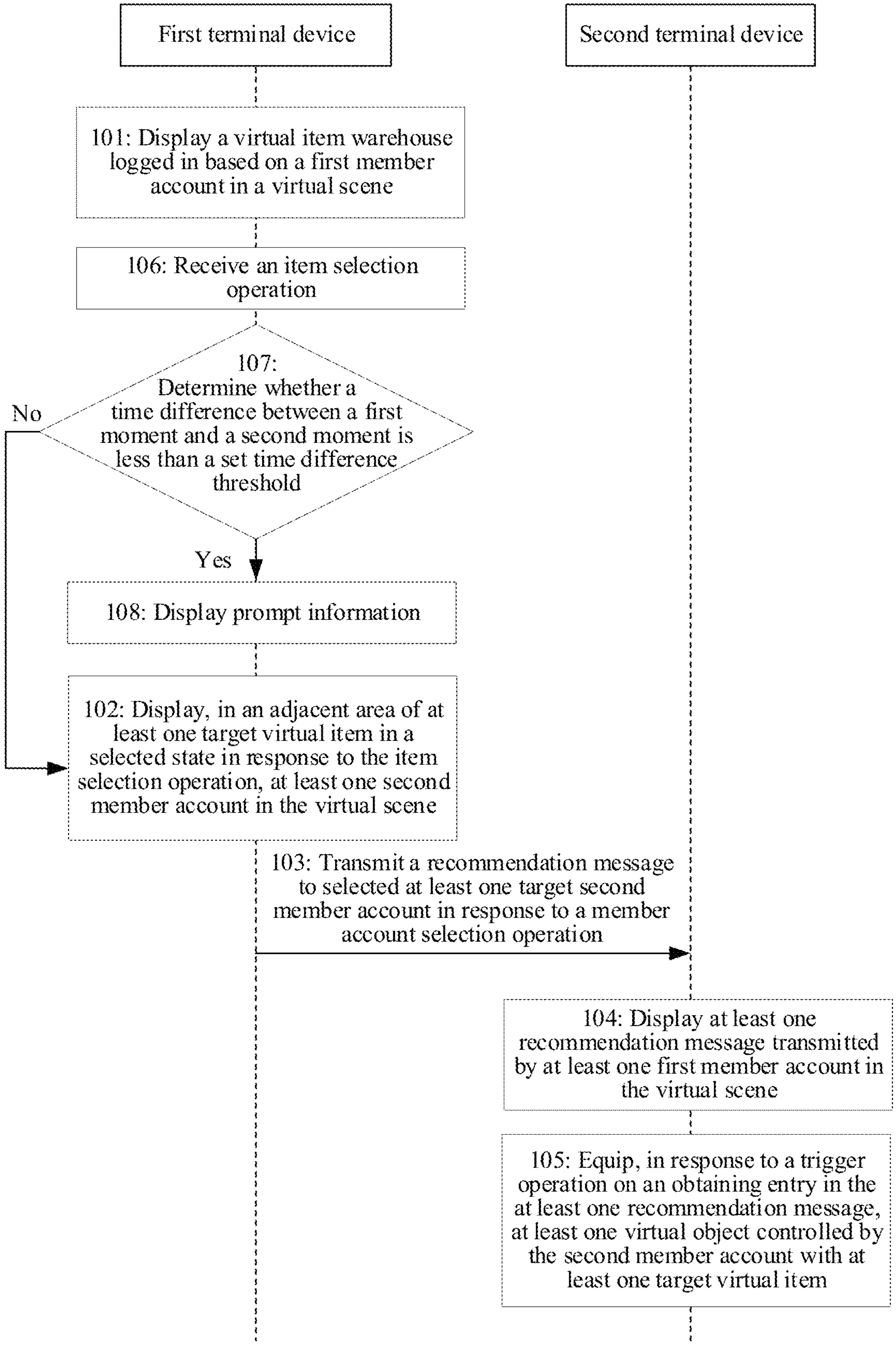
FIG. 5 is a schematic flowchart of an example interaction processing method in a virtual scene according to one or more aspects described herein.

Aspects further provide a computer-readable storage medium, having computer-executable instructions stored therein, the computer-executable instructions, when executed by a processor, causing the processor to perform the interaction processing method in a virtual scene according to aspects described herein such as, for example, the interaction processing method in a virtual scene shown in FIG. 3 or FIG. 5.

In some examples, the computer-readable storage medium may be a memory such as an FRAM, a ROM, a PROM, an EPROM, an EEPROM, a flash memory, a magnetic surface memory, an optical disk, or a CD-ROM; or may be any device including one of or any combination of the foregoing memories.

In some arrangements, the executable instructions can be written in a form of a program, software, a software module, a script, or code and according to a programming language (including a compiler or interpreter language or a declarative or procedural language) in any form, and may be deployed in any form, including an independent program or a module, a component, a subroutine, or another unit suitable for use in a computing environment.

As an example, the executable instructions may be deployed to be executed on an electronic device, or deployed to be executed on a plurality of electronic devices at the same location, or deployed to be executed on a plurality of electronic devices that are distributed in a plurality of locations and interconnected by using a communication network.

The foregoing descriptions are merely examples and are not intended to limit the protection scope of this application. Any modification, equivalent replacement, or improvement made without departing from the spirit and range of this application shall fall within the protection scope of this application.

What is claimed is:

1. An interaction processing method in a virtual scene, performed by an electronic device for reducing resource consumption of the electronic device in recommending virtual items within a virtual scene rendered on the electronic device, the method comprising:

generating and displaying, by the electronic device on a display screen, a virtual item warehouse, the virtual item warehouse corresponding to a first member account logged into the virtual scene, the virtual item warehouse comprising a plurality of virtual items;

detecting, via a user interface of the electronic device, an item selection operation corresponding to a user selecting at least one target virtual item from the plurality of virtual items in the virtual item warehouse;

in response to detecting the item selection operation, generating, by the electronic device, in an adjacent area of the at least one target virtual item on the display screen, a display of a visual representation of at least one second member account logged into the virtual scene, the at least one second member account being any member account other than the first member account;

detecting, by the electronic device, a member account selection operation corresponding to a selection of at least one target second member account of the displayed at least one second member account; and in response to detecting the selection of the target second member account, transmitting, by the electronic device via a network interface of the electronic device to a second electronic device associated with the at least one target second member account, a recommendation message to the at least one target second member account, the recommendation message carrying an obtaining entry corresponding to the at least one target virtual item in the virtual item warehouse, the obtaining entry including code configured to allow the at least one target second member account to obtain the at least one target virtual item, wherein the obtaining entry, when triggered at the second electronic device, causes a virtual object controlled by the at least one target second member account to be equipped with the at least one target virtual item without requiring the second electronic device to generate and display the virtual item warehouse on the second electronic device.

2. The method according to claim 1, wherein the generating a display of at least one second member account in the virtual scene comprises:

performing the following processing for each second member account:

displaying the second member account in an untriggerable state in response to determining that the second member account currently owns the at least one target virtual item or is not qualified to use the at least one target virtual item; and displaying the second member account in a triggerable state in response to determining that the second member account does not currently the at least one target virtual item and is qualified to use the at least one target virtual item.

3. The method according to claim 1, wherein the generating a display of at least one second member account in the virtual scene comprises:

obtaining a second member account having a social relationship with the first member account in the virtual scene;

removing, from a plurality of second member accounts, a second member account that meets at least one of the following conditions: the second member account currently owns the at least one target virtual item, or the second member account is not qualified to use the at least one target virtual item; and displaying one or more remaining second member accounts of the at least one second member account.

4. The method according to claim 1, wherein when the at least one second member account comprises a plurality of second member accounts, the generating a display of at least one second member account in the virtual scene comprises:

generating a display of the plurality of second member accounts in the virtual scene, the plurality of second member accounts being displayed in a specific sorting manner, and the sorting manner comprising:

descending order of function priorities of the plurality of second member accounts in the virtual scene;

descending order of interaction frequencies between the plurality of second member accounts and the first member account;

ordering based on when the plurality of second member accounts most recently interacted with the first member account; or descending ordering of levels of the plurality of second member accounts.

5. The method according to claim 1, wherein before the generating a display of at least one second member account in the virtual scene, the method further comprises:

generating prompt information in response to determining that a time difference between a first moment and a second moment is less than a set time difference threshold, the prompt information being configured for indicating that an item recommendation function is currently in a cool down state; and transferring to the processing of the generating a display of at least one second member account in the virtual scene in response to determining that the time difference between the first moment and the second moment is greater than the set time difference threshold, the first moment being a moment when the recommendation message was most recently transmitted, and the second moment being a moment when the item selection operation is detected.

6. The method according to claim 1, wherein a display manner of a virtual item recommended to the first member account is different from a display manner of another virtual item in the virtual item warehouse, and the recommended virtual item comprises at least one of the following: a virtual item of which a number of times used by the first member account is greater than a quantity threshold, or a virtual item collaboratively usable with a virtual item that is currently owned by the first member account.

7. The method according to claim 1, wherein when the at least one target virtual item comprises a plurality of target virtual items and the at least one target second member account comprises a plurality of target second member accounts, the transmitting a recommendation message to the at least one target second member account comprises:

performing one of the following processing:

transmitting a same recommendation message to the plurality of target second member accounts, the recommendation message carrying obtaining entries respectively corresponding to the plurality of target virtual items in the virtual item warehouse; or transmitting a plurality of recommendation messages in a one-to-one correspondence to the plurality of target second member accounts, each recommendation message carrying an obtaining entry corresponding to one target virtual item in the virtual item warehouse.

8. The method according to claim 7, wherein the transmitting a plurality of recommendation messages in a one-to-one correspondence to the plurality of target second member accounts comprises:

performing the following processing for each target second member account:

invoking a machine learning model to perform recommendation parameter prediction processing based on feature information of the target second member account, feature information of the virtual scene, and functions respectively owned by the plurality of target virtual items in the virtual scene, to obtain recommendation parameters respectively corresponding to the plurality of target virtual items; and transmitting the recommendation message carrying the obtaining entry of the target virtual item corresponding to the highest recommendation parameter to the target second member account.

9. The method according to claim 1, wherein the recommendation message further carries at least one of the following information: the first member account, or qualification for using the at least one target virtual item.

10. An electronic device, comprising:

a processor; and a memory storing executable instructions that, when executed, cause the electronic device to perform a method for reducing resource consumption of the electronic device in recommending virtual items within a virtual scene rendered on the electronic device, the method including:

generating and displaying, on a display screen, a virtual item warehouse, the virtual item warehouse corresponding to a first member account logged into the virtual scene, the virtual item warehouse comprising a plurality of virtual items;

detecting, via a user interface of the electronic device, an item selection operation corresponding to a user selecting at least one target virtual item from the plurality of virtual items in the virtual item warehouse;

in response to detecting the item selection operation, generating, in an adjacent area of the at least one target virtual item on the display screen, a display of a visual representation of at least one second member account logged into the virtual scene, the at least one second member account being any member account other than the first member account;

detecting a member account selection operation corresponding to a selection of at least one target second member account of the displayed at least one second member account; and in response to detecting the selection of the target second member account, transmitting, via a network interface of the electronic device to a second electronic device associated with the at least one target second member account, a recommendation message to the at least one target second member account, the recommendation message carrying an obtaining entry corresponding to the at least one target virtual item in the virtual item warehouse, the obtaining entry including code configured to allow the at least one target second member account to obtain the at least one target virtual item, wherein the obtaining entry, when triggered at the second electronic device, causes a virtual object controlled by the at least one target second member account to be equipped with the at least one target virtual item without requiring the second electronic device to generate and display the virtual item warehouse on the second electronic device.

11. The electronic device according to claim 10, wherein the generating a display of at least one second member account in the virtual scene comprises:

performing the following processing for each second member account:

displaying the second member account in an untriggerable state in response to determining that the second member account currently owns the at least one target virtual item or is not qualified to use the at least one target virtual item; and displaying the second member account in a triggerable state in response to determining that the second member account does not currently the at least one target virtual item and is qualified to use the at least one target virtual item.

12. The electronic device according to claim 10, wherein the generating a display of at least one second member account in the virtual scene comprises:

obtaining a second member account having a social relationship with the first member account in the virtual scene;

removing, from a plurality of second member accounts, a second member account that meets at least one of the following conditions: the second member account currently owns the at least one target virtual item, or the second member account is not qualified to use the at least one target virtual item; and displaying one or more remaining second member accounts of the at least one second member account.

13. The electronic device according to claim 10, wherein when the at least one second member account comprises a plurality of second member accounts, the generating a display of at least one second member account in the virtual scene comprises:

generating a display of the plurality of second member accounts in the virtual scene, the plurality of second member accounts being displayed in a specific sorting manner, and the sorting manner comprising:

descending order of function priorities of the plurality of second member accounts in the virtual scene;

descending order of interaction frequencies between the plurality of second member accounts and the first member account;

ordering based on when the plurality of second member accounts most recently interacted with the first member account; or descending ordering of levels of the plurality of second member accounts.

14. The electronic device according to claim 10, wherein the instructions, when executed, further cause the electronic device to perform, before the generating a display of at least one second member account in the virtual scene:

generating prompt information in response to determining that a time difference between a first moment and a second moment is less than a set time difference threshold, the prompt information being configured for indicating that an item recommendation function is currently in a cool down state; and transferring to the processing of the generating a display of at least one second member account in the virtual scene in response to determining that the time difference between the first moment and the second moment is greater than the set time difference threshold, the first moment being a moment when the recommendation message was most recently transmitted, and the second moment being a moment when the item selection operation is detected.

15. The electronic device according to claim 10, wherein a display manner of a virtual item recommended to the first member account is different from a display manner of another virtual item in the virtual item warehouse, and the recommended virtual item comprises at least one of the following: a virtual item of which a number of times used by the first member account is greater than a quantity threshold, or a virtual item collaboratively usable with a virtual item that is currently owned by the first member account.

16. A non-transitory computer-readable storage medium storing computer-executable instructions stored therein, the computer-executable instructions, when executed by a processor, causing an electronic device to reduce resource consumption of the electronic device in recommending virtual items within a virtual scene rendered on the electronic device by performing:

generating and displaying, on a display screen, a virtual item warehouse, the virtual item warehouse corresponding to a first member account logged into the virtual scene, the virtual item warehouse comprising a plurality of virtual items;

detecting an item selection operation corresponding to a user selecting at least one target virtual item from the plurality of virtual items in the virtual item warehouse, wherein the item selection operation is detected via a user interface of the electronic device;

in response to detecting the item selection operation, generating, in an adjacent area of the at least one target virtual item on the display screen, a display of a visual representation of at least one second member account logged into the virtual scene, the at least one second member account being any member account other than the first member account;

detecting a member account selection operation corresponding to a selection of at least one target second member account of the displayed at least one second member account; and in response to detecting the selection of the target second member account, transmitting, via a network interface of the electronic device to a second electronic device associated with the at least one target second member account, a recommendation message to the at least one target second member account, the recommendation message carrying an obtaining entry corresponding to the at least one target virtual item in the virtual item warehouse, the obtaining entry including code configured to allow the at least one target second member account to obtain the at least one target virtual item, wherein the obtaining entry, when triggered at the second electronic device, causes a virtual object controlled by the at least one target second member account to be equipped with the at least one target virtual item without requiring the second electronic device to generate and display the virtual item warehouse on the second electronic device.

17. The non-transitory computer-readable storage medium according to claim 16, wherein the generating a display of at least one second member account in the virtual scene comprises:

performing the following processing for each second member account:

displaying the second member account in an untriggerable state in response to determining that the second member account currently owns the at least one target virtual item or is not qualified to use the at least one target virtual item; and displaying the second member account in a triggerable state in response to determining that the second member account does not currently the at least one target virtual item and is qualified to use the at least one target virtual item.

18. The non-transitory computer-readable storage medium according to claim 16, wherein the generating a display of at least one second member account in the virtual scene comprises:

obtaining a second member account having a social relationship with the first member account in the virtual scene;

removing, from a plurality of second member accounts, a second member account that meets at least one of the following conditions: the second member account currently owns the at least one target virtual item, or the second member account is not qualified to use the at least one target virtual item; and displaying one or more remaining second member accounts of the at least one second member account.

19. The non-transitory computer-readable storage medium according to claim 16, wherein when the at least one second member account comprises a plurality of second member accounts, the generating a display of at least one second member account in the virtual scene comprises:

generating a display of the plurality of second member accounts in the virtual scene, the plurality of second member accounts being displayed in a specific sorting manner, and the sorting manner comprising:

descending order of function priorities of the plurality of second member accounts in the virtual scene;

descending order of interaction frequencies between the plurality of second member accounts and the first member account;

ordering based on when the plurality of second member accounts most recently interacted with the first member account; or descending ordering of levels of the plurality of second member accounts.

20. The non-transitory computer-readable storage medium according to claim 16, wherein the instructions, when executed, further cause the electronic device to perform, before the generating a display of at least one second member account in the virtual scene:

generating prompt information in response to determining that a time difference between a first moment and a second moment is less than a set time difference threshold, the prompt information being configured for indicating that an item recommendation function is currently in a cool down state; and transferring to the processing of the generating a display of at least one second member account in the virtual scene in response to determining that the time difference between the first moment and the second moment is greater than the set time difference threshold, the first moment being a moment when the recommendation message was most recently transmitted, and the second moment being a moment when the item selection operation is detected.

* * * * *